(12) United States Patent
Matsuda

(10) Patent No.: US 11,773,193 B2
(45) Date of Patent: Oct. 3, 2023

(54) HYDROGENATED COPOLYMER AND METHOD OF PRODUCING THE SAME, HYDROGENATED COPOLYMER-CONTAINING COMPOSITION, INTERLAYER FILM FOR LAMINATED GLASS, INTERLAYER FILM LAMINATE FOR LAMINATED GLASS, SEALING MATERIAL, OPTICAL FILM, MEDICAL SHAPED ARTICLE AND METHOD OF PRODUCING THE SAME, ADHESIVE, AND ASSEMBLY AND METHOD OF PRODUCING THE SAME

(71) Applicant: ZEON CORPORATION, Tokyo (JP)

(72) Inventor: Hiroaki Matsuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 253 days.

(21) Appl. No.: 17/282,777

(22) PCT Filed: Oct. 8, 2019

(86) PCT No.: PCT/JP2019/039706
§ 371 (c)(1),
(2) Date: Apr. 5, 2021

(87) PCT Pub. No.: WO2020/080202
PCT Pub. Date: Apr. 23, 2020

(65) Prior Publication Data
US 2021/0388125 A1    Dec. 16, 2021

(30) Foreign Application Priority Data

Oct. 17, 2018 (JP) ................................ 2018-195913
Apr. 19, 2019 (JP) ................................ 2019-080313

(51) Int. Cl.
*C08F 8/04* (2006.01)
*B29C 65/48* (2006.01)
(Continued)

(52) U.S. Cl.
CPC ............ *C08F 8/04* (2013.01); *B29C 65/4845* (2013.01); *B29C 66/72321* (2013.01);
(Continued)

(58) Field of Classification Search
CPC .. C08F 8/04; C08F 8/42; C08F 236/10; C08F 293/00; C08F 297/04; C08F 4/48;
(Continued)

(56) References Cited

U.S. PATENT DOCUMENTS 6,235,847 B1 * 5/2001 Hoshi .................... C08L 53/02
                                                    525/98
7,893,156 B2    2/2011 Hoshi et al.
(Continued)

FOREIGN PATENT DOCUMENTS

CN     1649923 A    8/2005
EP     2623526 A1   8/2013
(Continued)

OTHER PUBLICATIONS

Translation of JP 2006-111650 (Year: 2006).*
(Continued)

*Primary Examiner* — Robert C Boyle
(74) *Attorney, Agent, or Firm* — KENJA IP LAW PC

(57) ABSTRACT

Disclosed is a hydrogenated copolymer obtained by hydrogenating a copolymer which comprises an aromatic vinyl monomer unit and a chain conjugated diene monomer unit. When, among at least two hydrogenated copolymer-derived peaks in an elution curve measured by gel permeation chromatography of a sample containing the hydrogenated product, a hydrogenated copolymer-derived peak exhibiting
(Continued)

a peak top with the earliest elution time is defined as a first peak and a hydrogenated copolymer-derived peak exhibiting a peak top with the second earliest elution time is defined as a second peak, the ratio of a standard polystyrene-equivalent molecular weight based on the elution time of the first peak (first peak molecular weight) to a standard polystyrene-equivalent molecular weight based on the elution time of the second peak (second peak molecular weight) is 1.50 or more. The second peak molecular weight is 1,000 or more.

7 Claims, 3 Drawing Sheets

(51) Int. Cl.
| | |
|---|---|
| *B29C 65/00* | (2006.01) |
| *B32B 17/10* | (2006.01) |
| *C08F 8/42* | (2006.01) |
| *C08F 236/10* | (2006.01) |
| *C08K 5/00* | (2006.01) |
| *C08K 5/14* | (2006.01) |
| *C08K 5/56* | (2006.01) |
| *C09J 153/02* | (2006.01) |

(52) U.S. Cl.
CPC ............ *B32B 17/1055* (2013.01); *C08F 8/42* (2013.01); *C08F 236/10* (2013.01); *C08K 5/005* (2013.01); *C08K 5/14* (2013.01); *C08K 5/56* (2013.01); *C09J 153/025* (2013.01); *B32B 2307/102* (2013.01)

(58) Field of Classification Search
CPC .......... B29C 65/4845; B29C 66/72321; B32B 17/1055; B32B 2307/102; C08K 5/005; C08K 5/14; C08K 5/13; C08K 5/49; C08K 5/56; C09J 5/02; C09J 153/02; C09J 153/025; C08J 2353/02; C08J 5/18; C08L 2203/02; C08L 2203/16; C08L 53/025

See application file for complete search history.

(56) References Cited

U.S. PATENT DOCUMENTS

| | | | |
|---|---|---|---|
| 9,752,027 | B2 | 9/2017 | Sasaki et al. |
| 2011/0245405 | A1 | 10/2011 | Jogo et al. |
| 2013/0008506 | A1* | 1/2013 | Tanahashi ............ C09J 153/025 136/259 |
| 2015/0104654 | A1 | 4/2015 | Kohara et al. |
| 2015/0307758 | A1 | 10/2015 | Tazaki et al. |
| 2016/0146977 | A1 | 5/2016 | Ishiguro et al. |
| 2016/0213796 | A1 | 7/2016 | Kohara et al. |
| 2016/0343970 | A1 | 11/2016 | Tazaki et al. |
| 2017/0151757 | A1* | 6/2017 | Kohara .................. C23C 14/086 |
| 2017/0291966 | A1 | 10/2017 | Saito et al. |
| 2019/0016106 | A1 | 1/2019 | Ishiguro et al. |

FOREIGN PATENT DOCUMENTS

| | | | |
|---|---|---|---|
| EP | 2980153 A1 | | 2/2016 |
| EP | 3081613 A1 | | 10/2016 |
| EP | 3093141 A1 | | 11/2016 |
| JP | 2004-043564 | * | 2/2004 |
| JP | 2006-111650 | * | 4/2006 |
| JP | 2012126822 A | | 7/2012 |
| JP | 2015078090 A | | 4/2015 |
| JP | 201522480 A | | 6/2015 |
| JP | 2016020508 A | | 2/2016 |
| JP | 2017159590 A | | 9/2017 |
| JP | 2017171833 A | | 9/2017 |
| JP | 2018048236 A | | 3/2018 |
| WO | 0008079 A1 | | 2/2000 |
| WO | 2011096389 A1 | | 8/2011 |
| WO | 2012043708 A1 | | 4/2012 |
| WO | 2013176258 A1 | | 11/2013 |
| WO | 2014091941 A1 | | 6/2014 |
| WO | 2015002020 A1 | | 1/2015 |
| WO | 2015005292 A1 | | 1/2015 |
| WO | 2015033876 A1 | | 3/2015 |
| WO | 2015099079 A1 | | 7/2015 |
| WO | 2015105127 A1 | | 7/2015 |
| WO | 2016006610 A1 | | 1/2016 |
| WO | 2016060070 A1 | | 4/2016 |
| WO | 2017154718 A1 | | 9/2017 |

OTHER PUBLICATIONS

Translation of JP 2004-043564 (Year: 2004).*
Apr. 14, 2021, International Preliminary Report on Patentability issued in the International Patent Application No. PCT/JP2019/039706.
Jun. 3, 2022, the Extended European Search Report issued by the European Patent Office in the corresponding European Patent Application No. 19872750.5.

* cited by examiner

HYDROGENATED COPOLYMER AND METHOD OF PRODUCING THE SAME, HYDROGENATED COPOLYMER-CONTAINING COMPOSITION, INTERLAYER FILM FOR LAMINATED GLASS, INTERLAYER FILM LAMINATE FOR LAMINATED GLASS, SEALING MATERIAL, OPTICAL FILM, MEDICAL SHAPED ARTICLE AND METHOD OF PRODUCING THE SAME, ADHESIVE, AND ASSEMBLY AND METHOD OF PRODUCING THE SAME

TECHNICAL FIELD

The present disclosure relates to a hydrogenated copolymer and a method of producing the same, a hydrogenated copolymer-containing composition, an interlayer film for laminated glass, an interlayer film laminate for laminated glass, a sealing material, an optical film, a medical shaped article and a method of producing the same, an adhesive, and an assembly and a method of producing the same.

BACKGROUND

Hydrogenated copolymers comprising an aromatic vinyl monomer unit and a conjugated diene monomer unit have heretofore been used for various purposes or in various applications, e.g., (i) as base polymers of adhesive compositions with excellent balance of retention, tackiness, and adhesion as well as low melt viscosity (e.g., PTL 1), and (ii) for thermoplastic elastomer compositions with excellent fluidity, compression set property, and flexibility (e.g., PTL 2).

CITATION LIST

Patent Literatures

PTL 1: JP2012-126822 A
PTL 2: JP2016-20508 A

SUMMARY

Technical Problem

However, there was room for improving the prior art hydrogenated copolymers in terms of increasing mold printability. There was also room for reducing film thickness unevenness when forming films using the hydrogenated copolymers.

An object of the present disclosure is therefore to provide means for advantageously attaining the aforementioned improvements.

Solution to Problem

The inventor conducted diligent investigation with the aim of solving the problem set forth above. The inventor established that, by using a hydrogenated copolymer having a predetermined hydrogenated copolymer-derived peak (first peak) exhibiting a peak top with the earliest elution time and a predetermined hydrogenated copolymer-derived peak (second peak) exhibiting a peak top with the second earliest elution time, it is possible to improve mold printability and reduce film thickness unevenness upon film forming, thereby completing the present disclosure.

The term "film thickness unevenness" as used herein means "thickness variations in the tensile direction when forming a film by T-die extrusion" and this film thickness unevenness is required to be small.

Specifically, an object of the present disclosure is to advantageously solve the problem set forth above, and the disclosed hydrogenated copolymer is a hydrogenated copolymer obtained by hydrogenating a copolymer comprising an aromatic vinyl monomer unit and a chain conjugated diene (linear and/or branched conjugated diene) monomer unit, wherein an elution curve measured by gel permeation chromatography (GPC) of a sample containing the hydrogenated copolymer has at least two hydrogenated copolymer-derived peaks, and when, among the at least two hydrogenated copolymer-derived peaks, a hydrogenated copolymer-derived peak exhibiting a peak top with the earliest elution time is defined as a first peak and a hydrogenated copolymer-derived peak exhibiting a peak top with the second earliest elution time is defined as a second peak, the ratio of the standard polystyrene-equivalent molecular weight based on the elution time of the first peak (first peak molecular weight) to the standard polystyrene-equivalent molecular weight based on the elution time of the second peak (second peak molecular weight) (first peak molecular weight/second peak molecular weight) is 1.50 or more, and the second peak molecular weight is 1,000 or more. By using a such a hydrogenated copolymer, mold printability can be improved and also film thickness unevenness during film forming can be reduced.

The phrase "a copolymer comprises a monomer unit" and other equivalent expressions as used herein means that "a structural unit derived from a monomer is included in a copolymer obtained using that monomer."

Preferably, disclosed hydrogenated copolymer has the first peak molecular weight of 15,000 or more and 200,000 or less.

When the first peak molecular weight of the hydrogenated copolymer is 15,000 or more and 200,000 or less, mold printability and film formability can be favorably maintained.

Preferably, the disclosed hydrogenated copolymer is obtained by hydrogenating carbon-carbon unsaturated bonds of a main chain and side chains of a block copolymer comprising at least two polymer blocks [A] comprising an aromatic vinyl monomer unit as a main component and at least one polymer block [B] comprising a chain conjugated diene monomer unit as a main component, wherein when the mass fraction of the total aromatic vinyl monomer unit in the block copolymer is defined as wA and the mass fraction of the total chain conjugated diene monomer unit in the block copolymer is defined as wB, the ratio of wA to wB (wA:wB) is 20:80 to 60:40.

By using a hydrogenated copolymer obtained by hydrogenating carbon-carbon unsaturated bonds of the main chain and side chains of a block copolymer having a wA-to-wB ratio (wA:wB) of 20:80 to 60:40, it is possible to prevent reduction in impact resistance and rigidity of the hydrogenated copolymer at low temperatures.

As used herein, the term "aromatic vinyl monomer unit" means "structural unit derived from an aromatic vinyl monomer (aromatic vinyl compound)", the term "chain conjugated diene monomer unit" means "structural unit derived from a chain conjugated diene monomer (chain conjugated diene compound)", the phrase "comprises an aromatic vinyl monomer unit as a main component" means "comprises more than 50% by mass of an aromatic vinyl monomer unit," and the phrase "comprise a chain conjugated diene monomer unit as a main component" means "comprise more than 50% by mass of a chain conjugated diene monomer unit."

As used herein, the term "percent hydrogenation" refers to a proportion of hydrogenated unsaturated bonds among all the unsaturated bonds included in the copolymer and can be determined by $^1$H-NMR described in Examples herein.

Preferably, in the disclosed hydrogenated copolymer, 90% or more of carbon-carbon unsaturated bonds of aromatic rings of the block copolymer are hydrogenated.

By using a hydrogenated copolymer wherein 90% or more of carbon-carbon unsaturated bonds of aromatic rings of a block copolymer having a wA-to-wB ratio (wA:wB) of 20:80 to 60:40 are hydrogenated, it is possible to further prevent reduction in impact resistance and rigidity of the hydrogenated copolymer at low temperatures.

Preferably, in the disclosed hydrogenated copolymer, the block copolymer is a triblock or pentablock copolymer.

By using a hydrogenated copolymer which is a hydrogenated product of a triblock or pentablock copolymer, it is possible to obtain a resin which does not reduce impact resistance and rigidity at low temperatures while maintaining mold printability and film formability.

An object of the present disclosure is to advantageously solve the above problem and the disclosed hydrogenated copolymer-containing composition comprises any of the hydrogenated copolymers described above and at least either a phosphorous antioxidant or a phenol anti-aging agent, wherein the total amount of the phosphorus antioxidant and the phenol anti-aging agent is 0.001 parts by mass or more and 1.0 part by mass or less per 100 parts by mass of the hydrogenated copolymer.

By using such a hydrogenated copolymer-containing composition comprising predetermined amounts of at least any of the hydrogenated copolymers described above and at least either a phosphorous antioxidant or a phenol anti-aging agent, mold printability can be improved and unevenness in film thickness upon film forming can be prevented.

An object of the present disclosure is to advantageously solve the problem set forth above and the disclosed hydrogenated copolymer-containing composition comprises any of the above-mentioned hydrogenated copolymers and a processing aid, wherein the amount of the processing aid is 40 parts by mass or less per 100 parts by mass of the hydrogenated copolymer.

By using such a hydrogenated copolymer-containing composition comprising predetermined amounts of any of the above-described hydrogenated copolymers and a processing aid, it is possible to prevent reduction in heat resistance and increases in eluate amount when the composition is formed into an interlayer film for laminated glass.

An object of the present disclosure is to advantageously solve the problem set forth above and the disclosed method of producing any of the hydrogenated copolymers described above comprises a copolymerization step wherein an aromatic vinyl monomer and a chain conjugated diene monomer are copolymerized using an initiator containing an organolithium compound, and a hydrogenation step wherein a copolymer obtained by the copolymerization step is hydrogenated.

By hydrogenating such a copolymer that is obtained by copolymerizing an aromatic vinyl monomer and a chain conjugated diene monomer using an initiator containing an organolithium compound, it is possible to efficiently produce a hydrogenated copolymer capable of improving mold printability and reducing film thickness unevenness upon film forming.

An object of the present disclosure is to advantageously solve the problem set forth above and the disclosed interlayer film for laminated glass comprises a modified product in which an alkoxysilyl group is introduced into any of the hydrogenated copolymers described above.

By including a modified product in which an alkoxysilyl group is introduced into a hydrogenated copolymer, it is possible to prevent adhesion reduction after storage.

Preferably, in the disclosed interlayer film for laminated glass, the amount of the alkoxysilyl group introduced is 0.1 parts by mass or more and 10 parts by mass or less per 100 parts by mass of the hydrogenated copolymer.

When the amount of the alkoxysilyl group introduced is 0.1 parts by mass or more and 10 parts by mass or less per 100 parts by mass of the hydrogenated copolymer, it is possible to ensure that adhesion reduction after storage is prevented.

An object of the present disclosure is to advantageously solve the problem set forth above and the disclosed interlayer film for laminated glass comprises a modified product in which an acid anhydride group is introduced into any of the hydrogenated copolymers described above.

By including a modified product in which an acid anhydride group is introduced into the hydrogenated copolymer, it is possible to prevent adhesion reduction after storage.

Preferably, in the disclosed interlayer film for laminated glass, the amount of the acid anhydride group introduced is 0.1 parts by mass or more and 10 parts by mass or less per 100 parts by mass of the hydrogenated copolymer.

When the amount of the acid anhydride group to be introduced is 0.1 parts by mass or more and 10 parts by mass or less per 100 parts by mass of the hydrogenated copolymer, it is possible to ensure that adhesion reduction after storage is prevented.

An object of the present disclosure is to advantageously solve the problem set forth above and the disclosed interlayer film laminate for laminated glass comprises two or more laminated interlayer films for laminated glass, wherein at least one of outermost layers is any of the above-mentioned interlayer films for laminated glass.

When the at least one of the outermost layers is any of the above-mentioned interlayer films for laminated glass, impact resistance can be improved.

Preferably, in the disclosed interlayer laminate for laminated glass, one of the outermost layers is an interlayer film for laminated glass comprising a modified product in which an alkoxysilyl group is introduced into any of the hydrogenated copolymers described above, and the other outermost layer is an interlayer film for laminated glass comprising a modified product in which an acid anhydride group is introduced into any of the hydrogenated copolymers described above.

When one of the outermost layers is an interlayer film for laminated glass comprising a modified product in which an alkoxysilyl group is introduced into the hydrogenated copolymer and the other outermost layer is an interlayer film for laminated glass comprising a modified product in which an acid anhydride group is introduced into the hydrogenated copolymer, it is possible to increase impact resistance.

An object of the present disclosure is to advantageously solve the problem set forth above and the disclosed sealing material comprises any of the hydrogenated copolymers described above.

By including the hydrogenated copolymer, it is possible to prevent adhesion reduction after storage.

An object of the present disclosure is to advantageously solve the problem set forth above and the disclosed sealing material comprises a modified product in which an alkoxysilyl group is introduced into any of the hydrogenated copolymers described above.

By including a modified product in which an alkoxysilyl group is introduced into a hydrogenated copolymer, it is possible to prevent adhesion reduction after storage.

Preferably, in the disclosed sealing material, the amount of the alkoxysilyl group introduced is 0.1 parts by mass or more and 10 parts by mass or less per 100 parts by mass of the hydrogenated copolymer.

When the amount of the alkoxysilyl group introduced is 0.1 parts by mass or more and 10 parts by mass or less per 100 parts by mass of the hydrogenated copolymer, it is possible to ensure that adhesion reduction after storage is prevented.

Preferably, the disclosed sealing material has a multilayer structure comprising a layer made of the hydrogenated copolymer and a layer made of a modified product in which an alkoxysilyl group is introduced into the hydrogenated copolymer.

When the sealing material has a multilayer structure comprising a layer made of a hydrogenated copolymer and a layer made of a modified product in which an alkoxysilyl group is introduced into a hydrogenated copolymer, adhesion reduction after storage can be prevented.

An object of the present disclosure is to advantageously solve the problem set forth above and the disclosed optical film comprises any of the hydrogenated copolymers described above.

By including any of the hydrogenated copolymers described above, it is possible to improve retardation accuracy and to prevent light leakage after storage.

An object of the present disclosure is to advantageously solve the problem set forth above and the disclosed medical shaped article is formed from any of the hydrogenated copolymer-containing compositions described above.

When formed from any of the hydrogenated copolymer-containing compositions described above, it is possible to improve the strength accuracy of the medica shaped article.

An object of the present disclosure is to advantageously solve the problem set forth above and the disclosed method of producing a medical shaped article is a method of producing the disclosed medical shaped article and comprises irradiating a medical shaped article with high-energy radiation at an irradiation dose E, the medical shaped article formed from a hydrogenated copolymer-containing composition comprising W parts by mass as calculated using Equation 1 below or more and 0.50 parts by mass or less of the phenol anti-aging agent per 100 parts by mass of the hydrogenated copolymer:

$$W=[0.46\times(100-H)+0.04]\times(E/25) \quad \text{Equation 1}$$

where W represents a part by mass of a phenol anti-aging agent per 100 parts by mass of a hydrogenated copolymer, H represents a percent hydrogenation of a hydrogenated copolymer expressed in units of percent, H is a numerical value of 99 to 100, and E represents an irradiation dose of high-energy radiation in units of kGy.

Elution can be reduced by irradiating a medical shaped article, formed from a hydrogenated copolymer-containing composition comprising W parts by mass as calculated using Equation 1 or more and 0.50 parts by mass or less of the phenol anti-aging agent per 100 parts by mass of the hydrogenated copolymer, with high-energy radiation at an irradiation dose E.

An object of the present disclosure is to advantageously solve the problem set forth above and the disclosed adhesive comprises a modified product in which an alkoxysilyl group is introduced into any of the hydrogenated copolymers described above.

By including a modified product in which an alkoxysilyl group is introduced into any of the hydrogenated copolymers described above, it is possible to improve adhesion strength after storage.

Preferably, the disclosed adhesive further comprises an organic solvent, wherein the amount of the organic solvent is 100 parts by mass or more and 1,000 parts by mass or less per 100 parts by mass of the modified product, and the modified product is dissolved in the organic solvent.

When the disclosed adhesive further comprises an organic solvent, the amount of the organic solvent is 100 parts by mass or more and 1,000 parts by mass or less per 100 parts by mass of the modified product, and the modified product is dissolved in the organic solvent, it is possible to increase adhesion strength after storage.

Preferably, in the disclosed adhesive, the organic solvent has a boiling point of 90° C. or higher.

When the boiling point of the organic solvent is 90° C. or higher, it is possible to ensure that adhesion strength after storage can be increased.

Preferably, the disclosed adhesive further comprises a silane coupling agent, wherein the amount of the silane coupling agent is 0.1 parts by mass or more and 10 parts by mass or less per 100 parts by mass of the modified product.

When the disclosed adhesive further comprises a silane coupling agent, and the amount of the silane coupling agent is 0.1 parts by mass or more and 10 parts by mass or less per 100 parts by mass of the modified product, it is possible to ensure that adhesion strength after storage can be increased.

Preferably, the disclosed adhesive further comprises a crosslinking aid and an organic peroxide.

When the disclosed adhesive further comprises a crosslinking aid and an organic peroxide, adhesion strength after storage can be further increased.

The disclosed adhesive allows a heat-resistant resin and a metal to be favorably bonded to each other.

An object of the present disclosure is to advantageously solve the problem set forth above and the disclosed assembly comprises an adhesive sheet which comprises any of the above-mentioned adhesives and a thermoplastic resin sheet, wherein the adhesive sheet and the thermoplastic resin sheet are bonded to each other.

When an adhesive sheet comprising any of the adhesives described above and a thermoplastic resin sheet are bonded to each other, adhesion strength after storage can be increased.

An object of the present disclosure is to advantageously solve the problem set forth above and the disclosed method of producing an assembly is a method of producing the disclosed assembly and comprises (1) a step wherein a bonding surface of either the adhesive sheet or the thermoplastic resin sheet is subjected to at least one activation treatment selected from plasma irradiation, excimer ultraviolet irradiation, and corona discharge, and (2) a step wherein the adhesive sheet and the thermoplastic resin sheet are placed on top of each other with bonding surfaces thereof facing each other and are compressed under pressure.

By subjecting a bonding surface of either the adhesive sheet or the thermoplastic resin sheet to at least one activation treatment selected from plasma irradiation, excimer ultraviolet irradiation, and corona discharge and compressing the adhesive sheet and the thermoplastic resin sheet under pressure with their bonding surfaces facing each other, it is possible to produce an assembly with increased adhesion strength after storage.

Advantageous Effect

According to the present disclosure, it is possible to provide a hydrogenated copolymer which can increase mold printability and reduce film thickness unevenness upon film forming, a hydrogenated copolymer-containing composition comprising the hydrogenated copolymer, a method of producing the hydrogenated copolymer, an interlayer film for laminated glass comprising a modified product of the hydrogenated copolymer, an interlayer film laminate for laminated glass comprising two or more laminated layers of the interlayer film for laminated glass, a sealing material comprising the hydrogenated copolymer, a sealing material comprising a modified product of the hydrogenated copolymer, an optical film comprising the hydrogenated copolymer, a medical shaped article formed from the hydrogenated copolymer-containing composition, a method of producing the medical shaped article, an adhesive comprising a modified product of the hydrogenated copolymer, an assembly in which an adhesive sheet comprising the adhesive and a thermoplastic resin sheet are laminated, and a method of producing the assembly.

DETAILED DESCRIPTION

Figure 1:
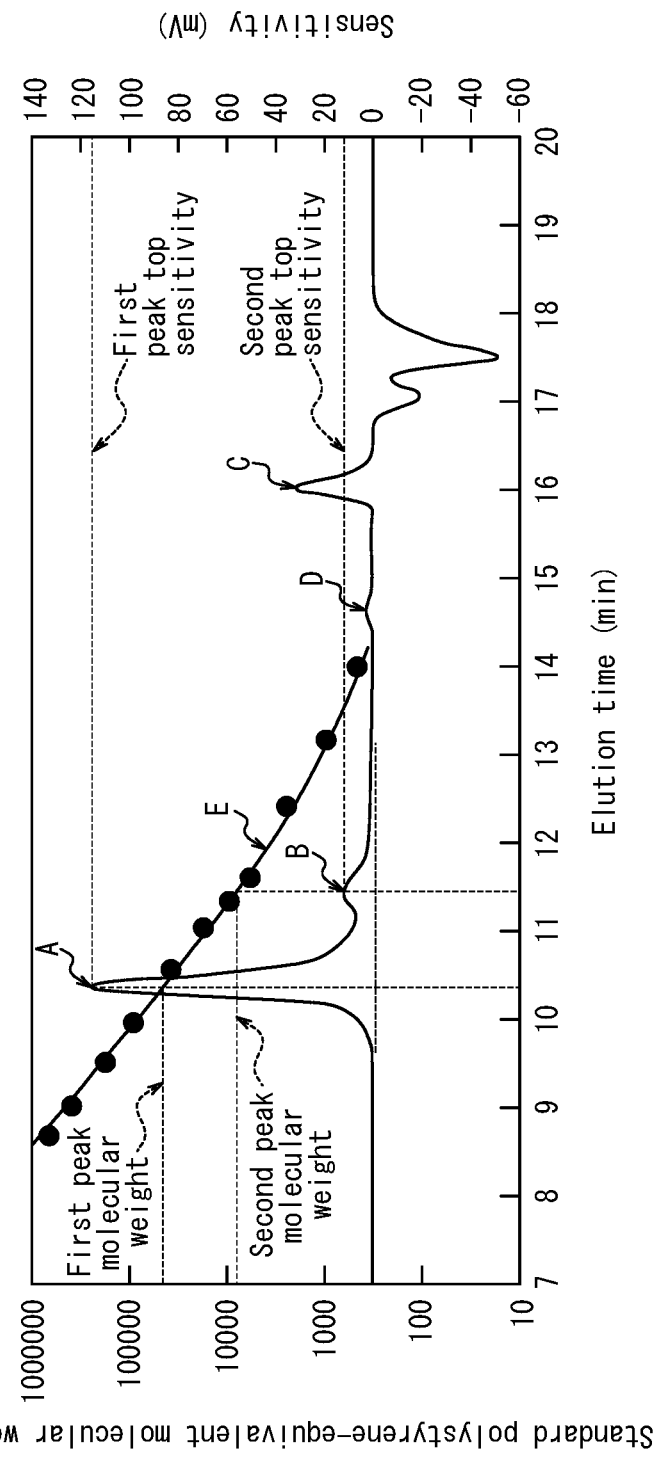
FIG. 1 is a diagram for explaining an example of an elution curve measured by gel permeation chromatography (GPC) of a sample containing a hydrogenated copolymer, where the vertical axis in FIG. 1 represents the polystyrene-equivalent molecular weight (left vertical axis) or sensitivity (mV) (right vertical axis), and the horizontal axis in FIG. 1 represents the elution time (min)

The following provides a detailed description of embodiments of the present disclosure.

The disclosed hydrogenated copolymer is used for preparing the disclosed hydrogenated copolymer-containing composition. Further, the disclosed hydrogenated copolymer is obtained by the disclosed method of producing a hydrogenated copolymer.

(Hydrogenated Copolymer)

The disclosed hydrogenated copolymer is a hydrogenated copolymer obtained by hydrogenating a copolymer comprising an aromatic vinyl monomer unit and a chain conjugated diene (linear and/or branched conjugated diene) monomer unit, wherein a sample containing the hydrogenated copolymer has at least two hydrogenated copolymer-derived peaks, and when, among the at least two hydrogenated copolymer-derived peaks, a hydrogenated copolymer-derived peak exhibiting a peak top with the earliest elution time is defined as a first peak and a hydrogenated copolymer-derived peak exhibiting a peak top with the second earliest elution time is defined as a second peak, the ratio of the standard polystyrene-equivalent molecular weight based on the elution time of the first peak (first peak molecular weight) to the standard polystyrene-equivalent molecular weight based on the elution time of the second peak (second peak molecular weight) (first peak molecular weight/second peak molecular weight) falls within a predetermined range, and the second peak molecular weight falls within a predetermined range.

Because an elution curve measured by gel permeation chromatography (GPC) of a sample containing the hydrogenated copolymer has a predetermined hydrogenated copolymer-derived peak exhibiting a peak top with the earliest elution time (first peak) and a predetermined hydrogenated copolymer-derived peak exhibiting a peak top with the second earliest elution time (second peak), the disclosed hydrogenated copolymer can increase mold printability and reduce film thickness unevenness upon film forming.

<Copolymer>

The copolymer is a precursor of the disclosed hydrogenated copolymer.

The structure of the copolymer is not particularly limited as long as it is a polymer comprising an aromatic vinyl unit and a chain dichotomous unit; the copolymer may be a block copolymer, a graft copolymer, a random copolymer, a tapered block copolymer or the like. From the viewpoint of low-temperature impact strength and tensile strength, the copolymer is preferably a block copolymer comprising a polymer block [A] comprising an aromatic vinyl monomer unit as a main component, and a polymer block [B] comprising a chain conjugated diene monomer unit as a main component.

The tapered block copolymer means a block copolymer containing not only a block copolymer portion but also a random copolymer portion, or a block copolymer in which a composition ratio of a block copolymer portion varies continuously. The tapered block copolymer may be a block copolymer containing a random copolymer portion having A and B compositions in a bonding portion between the block copolymers A and B, or may be a block copolymer in which the A and B compositions change continuously in the bonding portion between the block copolymers A and B.

Hereinafter, the composition and the structure when the copolymer is a block copolymer described above will be described in detail, but the structure of the copolymer is not limited to a block copolymer nor to the structure described herein.

The weight-average molecular weight (Mw) of the copolymer is preferably 7,000 or more, more preferably 10,000 or more, still more preferably 12,000 or more, and is preferably 190,000 or less, more preferably 150,000 or less, and still more preferably 100,000 or less. When the average molecular weight of the copolymer is 7,000 or more, film forming can be performed by extrusion molding, and when the average molecular weight of the copolymer is 190,000 or less, mold printability can be improved.

Further, the molecular weight distribution (Mw/Mn) of the copolymer is preferably 6 or less, preferably 5 or less, and more preferably 4 or less. When the molecular weight distribution is 6 or less, mold printability and film thickness unevenness can be improved.

The "weight-average molecular weight" and "molecular weight distribution" of a polymer can be measured by the methods described in Examples herein.

<<Aromatic Vinyl Monomer Unit>>

Examples of aromatic vinyl monomers capable of forming an aromatic vinyl monomer unit include styrene and derivatives thereof, and specific examples thereof include styrene, α-methylstyrene, 2-methylstyrene, 3-methylstyrene, 4-methylstyrene, 2,4-diisopropyl styrene, 2,4-dimethylstyrene, 4-t-butylstyrene, 5-t-butyl-2-methylstyrene, 4-monochlorostyrene, dichlorostyrene, 4-monofluorostyrene, and 4-phenylstyrene. Preferred are those which do not have a polar group in order to reduce moisture absorption; specifically, styrene, α-methylstyrene, 2-methylstyrene, 3-methylstyrene, 4-methylstyrene, 2,4-diisopropylstyrene, 2,4-dimethylstyrene, 4-t-butyl styrene, 5-t-butyl-2-methylstyrene, and 4-phenylstyrene are preferred, with styrene being particularly preferred for its high availability in the industry. One of these may be used individually, or two or more of these may be used in combination in an arbitrary ratio.

<<Chain Conjugated Diene Monomer Unit>>

Chain conjugated diene monomers capable of forming a chain conjugated diene monomer unit are not particularly limited. Preferred are those having no polar group in order to reduce moisture absorption. Specific examples include 1,3-butadiene, isoprene(2-methyl-1,3-butadiene), 2,3-dimethyl-1,3-butadiene, and 1,3-pentadiene. Of these, 1,3-butadiene and isoprene are particularly preferred because of their high availability in the industry. One of these may be used individually, or two or more of these may be used in combination in an arbitrary ratio.

<<Polymer Block [A]>>

The proportion of the aromatic vinyl monomer unit in the polymer block [A] is preferably 80% by mass or more, more preferably 90% by mass or more, still more preferably 95% by mass or more, and particularly preferably 100% by mass, based on the total repeating unit (100% by mass) in the polymer block [A]. When the proportion of the aromatic vinyl monomer unit in the polymer block [A] is 80% by mass or more, the microphase-separated domain derived from the polymer block [A] in the hydrogenated copolymer can be maintained, so that tensile strength and heat resistance of the aromatic monomer block can be maintained.

The polymer block [A] may comprise monomer unit(s) other than the aromatic vinyl monomer unit, and such other monomer units may be a chain conjugated diene monomer unit. Monomers capable of forming such other monomer units are preferably those having no polar group in order to reduce moisture absorption, and examples thereof include chain olefins such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene; and cyclic olefins such as vinylcyclohexane.

When the copolymer which is a block copolymer has more than one polymer block [A], the monomer compositions of the polymer blocks [A] may be the same or different.

<<Polymer Block [B]>>

The proportion of the chain conjugated diene monomer unit in the polymer block [B] is preferably 60% by mass or more, more preferably 80% by mass or more, still more preferably 90% by mass or more, and particularly preferably 100% by mass, based on the total repeating unit (100% by mass) in the polymer block [B]. When the proportion of the chain conjugated diene monomer unit in the polymer block [B] is 60% by mass or more, a glass transition temperature (Tg) derived from the polymer block [B] in the copolymer can be obtained, so that low-temperature impact strength can be maintained.

The polymer block [B] may comprise monomer unit(s) other than the chain conjugated diene monomer unit, and such other monomer units may be an aromatic vinyl monomer unit or may be formed of the chain or cyclic olefin described above in the section titled "Polymer block [A]."

When the copolymer which is a block copolymer has more than one polymer block [B], the monomer compositions of the polymer blocks [B] may be the same or different.

<<Block Copolymer>>

The block copolymer is a precursor of a hydrogenated block copolymer, which is one type of the disclosed hydrogenated copolymer. The block copolymer is a polymer comprising at least two polymer blocks [A] and at least one polymer block [B].

The number of the polymer block [A] in the copolymer which is a block copolymer is usually 5 or less, preferably 4 or less, more preferably 3 or less, and still more preferably 2.

In addition, the number of the polymer block [B] in the copolymer which is a block copolymer is usually 4 or less, preferably 3 or less, more preferably 2 or less, and still more preferably 1.

—wA:wB—

When the mass fraction of the total aromatic vinyl monomer unit in the entire block copolymer is defined as wA and the mass fraction of the total chain conjugated diene monomer unit in the entire block copolymer is defined as wB, the ratio of wA to wB (wA:wB) is preferably from 20:80 to 60:40, more preferably from 25:75 to 60:40, and still more preferably from 40:60 to 60:40.

Too high wA may reduce the impact resistance at low temperatures of a hydrogenated copolymer obtained from the copolymer. On the other hand, too low wA may reduce the rigidity of a hydrogenated copolymer obtained from the copolymer.

As to the ratio of wA to wB (wA:wB), in the process of producing the block copolymer, the mass fraction of each monomer unit can be calculated by the numbers of parts of the aromatic vinyl monomer, the chain conjugated diene monomer and other vinyl compounds used to produce the block copolymer and by the conversion ratio of the used monomers for each block of the block copolymer at the end stage of the polymerization as measured by gas chromatography (GC).

Block Structure

The form of the block of the copolymer which is a block copolymer may be a chain block or a radial block, but a chain block is preferable in terms of mechanical strength. In addition, it is preferable that the block copolymer has at least one structure wherein polymer blocks [A] are bonded to both ends of a polymer block [B] (i.e., A-B-A structure).

A particularly preferred form of the copolymer which is a block copolymer is a triblock copolymer (A-B-A) in which polymer blocks [A] are bonded to both ends of a polymer block [B] or a pentablock copolymer (A-B-A-B-A) in which polymer blocks [B] are bonded to both ends of a polymer block [A] and a polymer block [A] is bonded to the other end of each block [B], with a triblock copolymer (A-B-A) being most preferred.

<Hydrogenation of Copolymer>

By hydrogenating unsaturated bonds (including, e.g., carbon-carbon unsaturated bonds of the main chain and side chains, as well as carbon-carbon unsaturated bonds of aromatic rings) in the above-described copolymer, a hydrogenated copolymer can be obtained.

—Percent Hydrogenation—

The percent hydrogenation of the hydrogenated copolymer obtained by hydrogenation is preferably 90 mol % or more, preferably 97 mol % or more, and more preferably 99 mol % or more. When the percent hydrogenation is 90 mol % or more, weather resistance can be improved.

—Molecular Weight—

The weight-average molecular weight (Mw) of the hydrogenated copolymer is preferably 7,000 or more, more preferably 10,000 or more, still more preferably 12,000 or more, and is preferably 190,000 or less, more preferably 150,000 or less, and still more preferably 100,000 or less. When the average molecular weight of the copolymer is 7,000 or more, film forming can be performed by extrusion molding, and when the average molecular weight of the copolymer is 190,000 or less, mold printability can be improved.

Further, the molecular weight distribution (Mw/Mn) of the hydrogenated copolymer is preferably 7 or less, preferably 6 or less, and more preferably 5 or less. When the molecular weight distribution is 7 or less, mold printability and film thickness unevenness can be improved.

The percent hydrogenation of carbon-carbon unsaturated bonds derived from the chain conjugated diene compound and the percent hydrogenation of carbon-carbon unsaturated bonds derived from the aromatic vinyl compound of the hydrogenated copolymer can be determined, for example, by measuring $^1$H-NMR of the copolymer and the hydrogenated copolymer.

Methods, reaction form, etc. for hydrogenating unsaturated bonds of the hydrogenated copolymer are not particularly limited and hydrogenation can be carried out in accordance with methods known in the art.

Methods of selectively hydrogenating carbon-carbon unsaturated bonds of the main chain and side chains derived from the chain conjugated diene compound of the copolymer include those described for example in JP2015-78090A.

Methods of hydrogenating carbon-carbon unsaturated bonds of the main chain and side chains derived from the chain conjugated diene compound and carbon-carbon unsaturated bonds of the aromatic rings derived from the aromatic vinyl compound in the copolymer include those described for example in WO2011/096389 and WO2012/043708.

After completion of the hydrogenation reaction, the hydrogenation catalyst, or the hydrogenation catalyst and the polymerization catalyst, can be removed from the reaction solution, and then the solvent can be removed from the obtained solution to recover the hydrogenated copolymer.

—Hydrogenated Block Copolymer—

The hydrogenated block copolymer is one type of the disclosed hydrogenated copolymer.

The hydrogenated block copolymer may be a polymer obtained by selectively hydrogenating only carbon-carbon unsaturated bonds of the main chain and side chains derived from the chain conjugated diene compound of the block copolymer, or a polymer obtained by hydrogenating carbon-carbon unsaturated bonds of the main chain and side chains derived from the chain conjugated diene compound of the block copolymer and carbon-carbon unsaturated bonds of the aromatic rings derived from the aromatic vinyl compound, or a mixture thereof.

When only the carbon-carbon unsaturated bonds of the main chain and side chains derived from the chain conjugated diene compound of the block copolymer are selectively hydrogenated, the percent hydrogenation of the carbon-carbon unsaturated bonds of the main chain and the side chains is usually 95% or more, preferably 97% or more, and more preferably 99% or more, and the percent hydrogenation of the carbon-carbon unsaturated bonds of the aromatic rings derived from the aromatic vinyl compound is usually 10% or less, preferably 5% or less, and more preferably 3% or less.

Herein, "hydrogenating carbon-carbon unsaturated bonds of the main chain and side chains" means "hydrogenating double bonds derived from the chain conjugated diene compound in the block copolymer", and "hydrogenating carbon-carbon unsaturated bonds of the aromatic ring" means "hydrogenating double bonds derived from the aromatic ring in the block copolymer."

When the carbon-carbon unsaturated bonds of the main chain and side chains derived from the chain conjugated diene compound of the block copolymer and carbon-carbon unsaturated bonds of the aromatic ring derived from the aromatic vinyl compound are hydrogenated, the percent hydrogenation is 90% or more, preferably 95% or more, and more preferably 99% or more of the all carbon-carbon unsaturated bonds.

<Silane Modification>

The obtained hydrogenated copolymer and an ethylenically unsaturated silane compound may be reacted in the presence of a peroxide (silane modification) to introduce an alkoxysilyl group into the hydrogenated copolymer.

The alkoxysilyl group to be introduced corresponds to an ethylenically unsaturated silane compound to be described later used for silane modification. From the viewpoint of (i) adhesion to a different material such as glass or metal and (ii) dispersibility of fused silica, pulverizing silica, or clay such as the so-called montmorillonite, glass fibers, carbon fibers, carbon nanotubes, cellulose nanofibers, metal particles and the like, a methoxy group and an ethoxysilyl group are preferred, and a methoxysilyl group is more preferred. The alkoxysilyl group may be directly bonded to the hydrogenated copolymer or may be bonded via a divalent organic group such as an alkylene or alkylene oxycarbonylalkylene group.

<<Ethylenically Unsaturated Silane Compound>>

Ethylenically unsaturated silane compounds used for silane modification are not particularly limited as long as they can be reacted (e.g., by graft polymerization) with the hydrogenated copolymer to introduce an alkoxysilyl group into the hydrogenated copolymer. Examples of such ethylenically unsaturated silane compounds include vinyltrimethoxysilane, vinyltrimethoxysilane, allyltrimethoxysilane, allyltri ethoxysilane, dimethoxymethylvinylsilane, diethoxymethylvinylsilane, p-styryltrimethoxysilane, 3-methacryloxypropylmethyldimethoxysilane, 3-methacryloxypropyltrimethoxysilane, and 3-acryloxypropyltrimethoxysilane. Among these, vinyltrimethoxysilane and vinyltriethoxysilane are preferred, and vinyltrimethoxysilane is more preferred. One of these may be used individually, or two or more of these may be used in combination in an arbitrary ratio.

The amount of the ethylenically unsaturated silane compound to be used is usually 0.1 parts by mass or more, preferably 0.2 parts by mass or more, more preferably 0.3 parts by mass or more, and is usually 10 parts by mass or less, preferably 5 parts by mass or less, more preferably 3 parts by mass or less, per 100 parts by mass of the hydrogenated copolymer.

<<Peroxide>>

Peroxides used for silane modification are preferably those having a one-minute half-life temperature of 170° C.

to 190° C. and examples thereof include organic peroxides such as t-butylcumylperoxide, dicumylperoxide, di-t-hexylperoxide, 2,5-dimethyl-2,5-di-(t-butylperoxy)hexane, di-t-butylperoxide, and di-(2-t-butylperoxyisopropyl)benzene. One of these may be used individually, or two or more of these may be used in combination in an arbitrary ratio.

The amount of the peroxide to be used is usually 0.05 parts by mass or more, preferably 0.1 parts by mass or more, more preferably 0.2 parts by mass or more, and is usually 2 parts by mass or less, preferably 1 part by mass or less, more preferably 0.5 parts by mass or less, per 100 parts by mass of the hydrogenated copolymer.

(Amount of Introduced Alkoxysilyl Group)

The amount of the alkoxysilyl group introduced into the hydrogenated copolymer by silane modification is preferably 0.1 parts by mass or more, more preferably 0.5 parts by mass or more, still more preferably 1 part by mass or more, and is preferably 10 parts by mass or less, more preferably 5 parts by mass or less, and still more preferably 3 parts by mass or less, per 100 parts by mass of the hydrogenated copolymer.

—Molecular Weight—

Usually, the weight-average molecular weight (Mw) of the hydrogenated copolymer obtained by silane modification (silane-modified product) is not largely different from that of the source hydrogenated copolymer because only a small amount of an alkoxysilyl group is introduced; it is preferably 7,000 or more, more preferably 10,000 or more, still more preferably 12,000 or more, and is preferably 190,000 or less, more preferably 150,000 or less, and still more preferably 100,000 or less. When the weight-average molecular weight of the silane-modified product is 7,000 or more, the mechanical strength of the silane-modified product can be increased, and when it is 190,000 or less, workability of the silane-modified product can be secured.

The molecular weight distribution of the silane-modified product is preferably 7.5 or less, preferably 6.5 or less, and more preferably 5.5 or less. When the molecular weight distribution is 7.5 or less, workability and mechanical strength of the silane-modified product obtained from the hydrogenated copolymer can be increased.

Because silane modification is carried out in the presence of peroxide, the molecular weight distribution (Mw/Mn) of the silane-modified product tends to be larger than that of the source hydrogenated copolymer due to the concurrent cross-linking reactions and the cleavage reactions of the polymer <Elution Curve Measured by Gel Permeation Chromatography (GPC)>

The number of hydrogenated copolymer-derived peaks in the elution curve measured by gel permeation chromatography (GPC) of a sample containing the hydrogenated copolymer is not particularly limited as long as it is at least two, but is preferably 4 or less, more preferably 3 or less, and particularly preferably 2.

It is only necessary that the elution curve is one from which hydrogenated copolymer-derived peaks can be detected. The elution curve may be not only an elution curve obtained by GPC measurement of only the hydrogenated copolymer, but also an elution curve obtained from a composition containing the hydrogenated copolymer (e.g., a composition containing an anti-aging agent and the hydrogenated copolymer).

The term "peak" as used herein means a portion protruding with respect to the baseline, and the term "peak top" as used herein means a top point where the detection sensitivity (mV) of refractive index detector (RI) is highest.

Here, among the at least two hydrogenated copolymer-derived peaks, a hydrogenated copolymer-derived peak exhibiting a peak top with the earliest elution time is defined as a first peak, and a hydrogenated copolymer-derived peak exhibiting a peak top with the second earliest elution time is defined as a second peak. For example, in FIG. 1, A is the first peak, B is the second peak, C detected at an elution time of about 16 minutes is a peak derived from a solvent (e.g., cyclohexane) used when producing a hydrogenated copolymer, and two peaks detected on the negative side after 16.5 minutes are peaks derived from tetrahydrofuran (THF) as a solvent used in GPC measurement. D is the peak derived from the anti-aging agent.

In FIG. 1, E is a plot (calibration curve) of the molecular weight of the standard polystyrene as measured by GPC, and as shown in FIG. 1, from this calibration curve and the elution time of the hydrogenated copolymer as measured by GPC, "the standard polystyrene-equivalent molecular weight based on the elution time where the first peak shows the highest sensitivity (first peak molecular weight)" and "the standard polystyrene-equivalent molecular weight based on the elution time where the second peak shows the highest sensitivity (second peak molecular weight)" are calculated.

In the elution curve of FIG. 1, the peak D derived from the anti-aging agent is not derived from the disclosed hydrogenated copolymer.

<<First Peak>>

The standard polystyrene-equivalent molecular weight based on the elution time of the first peak (first peak molecular weight) is not particularly limited and is preferably 15,000 or more, more preferably 16,300 or more, still more preferably 20,000 or more, still more preferably 25,000 or more, still more preferably 45,000 or more, preferably 200,000 or less, more preferably 170,000 or less, still more preferably 140,000 or less, still more preferably 96,000 or less, and still more preferably 88,400 or less. When the standard polystyrene-equivalent molecular weight based on the elution time of the first peak (first peak molecular weight) is 15,000 or more, the impact strength of the resin can be secured, and when it is 200,000 or less, a film can be obtained by extrusion molding.

<<Second Peak>>

The standard polystyrene-equivalent molecular weight based on the elution time of the second peak (second peak molecular weight) is not particularly limited as long as it is 1,000 or more and is preferably 1,200 or more, more preferably 1,300 or more, still more preferably 1,500 or more, still more preferably 1,800 or more, still more preferably 9,200 or more, and preferably 153,800 or less, more preferably 100,000 or less, still more preferably 50,000 or less, and still more preferably 47,100 or less. Mold printability can be improved when the standard polystyrene-equivalent molecular weight based on the elution time of the second peak (second peak molecular weight) is 1,000 or more and is 153,800 or less.

The ratio of the standard polystyrene-equivalent molecular weight based on the elution time of the first peak (first peak molecular weight) to the standard polystyrene-equivalent molecular weight based on the elution time of the second peak (second peak molecular weight), i.e., first peak molecular weight/second peak molecular weight, is not particularly limited as long as it is 1.50 or more. The ratio of first peak molecular weight to second peak molecular weight is preferably 2.0 or more, more preferably 4.0 or more, still more preferably 4.89 or more, and is preferably 200 or less, more preferably 150 or less, still more preferably 100 or less, still more preferably 73.85 or less, and still more preferably 13.58 or less. When the ratio of the first peak molecular weight to the second peak molecular weight is 2.0 or more and is 200 or less, film thickness unevenness can be further improved.

The ratio of the detection sensitivity (mV) of refractive index detector (RI) indicated by the peak top of the first peak (first peak top sensitivity (mV) to the detection sensitivity (mV) of refractive index detector (RI) indicated by the peak top of the second peak (second peak top sensitivity) is not particularly limited and is preferably 0.01 or more, more preferably 0.015 or more, still more preferably 0.02 or more, still more preferably 4.01 or more, still more preferably 6.88 or more, still more preferably 9.36 or more, particularly preferably 10.18 or more, and is preferably 99 or less, more preferably 70 or less, still more preferably 50 or less, and still more preferably 26.39 or less. When the ratio of the first peak top sensitivity (mV) to the second peak top sensitivity (mV) is 0.01 or more, mold printability can be further improved, and when the ratio is 99 or less, film thickness unevenness can be further improved.

The term "detection sensitivity (mV) of refractive index detector (RI)" as used herein means the peak top sensitivity for each peak of a GPC elution curve; for example in FIG. 1, it corresponds to "peak top sensitivity (mV)."

By appropriately adjusting the weight-average molecular weight (Mw) and molecular weight distribution (Mw/Mn) of the copolymer to be subjected to hydrogenation reaction, hydrogenation temperature, hydrogenation reaction time, and hydrogen supply stop time in the hydrogenation reaction, a hydrogenated copolymer is obtained which has a predetermined first peak and a predetermined second peak in an elution curve as measured by gel permeation chromatography (GPC).

(Method of Producing Hydrogenated Copolymer)

The disclosed method of producing a hydrogenated copolymer is a method of producing the disclosed hydrogenated copolymer and comprises a copolymerization step and a hydrogenation step, and optionally comprise other step(s) such as a silane modification step.

<Copolymerization Step>

The copolymerization step is a step of copolymerizing an aromatic vinyl monomer and a chain conjugated diene monomer using an initiator containing an organolithium compound.

Copolymerization methods are not particularly limited as long as they are copolymerization using an initiator containing an organolithium compound. A copolymer can be prepared by polymerizing a monomer composition containing an aromatic vinyl monomer and a chain conjugated diene monomer by known methods.

—Organolithium Compounds—

The organolithium compound is usually one used for anionic polymerization, and is not particularly limited. Examples include monoorganolithium compounds such as n-butyllithium, sec-butyllithium, tert-butyllithium, n-propyllithium, iso-propyllithium, and benzyllithium; 1,4-dilithiobutane, 1,6-dilithiohexane, 1,10-dilithiodiphenylene, dilithiopolybutadiene, dilithiopolyisoprene, and multifunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene, and 1,3,5-trilithio-2,4,6-triethylbenzene. Among these, monoorganolithium compounds such as n-butyllithium and sec-butyllithium are preferred. One of these may be used individually, or two or more of these may be used in combination in an arbitrary ratio.

<Hydrogenation Step>

The hydrogenation step is a step of hydrogenating the copolymer obtained by the copolymerization step.

Methods of hydrogenating unsaturated bonds in the copolymer are not particularly limited and known methods can be employed. Hydrogenation methods are preferred which may prevent polymer chain cleavage reactions while increasing the percent hydrogenation. Such hydrogenation methods are described for example in WO2011/096389, WO2012/043708, etc.

<Silane Modification Step>

The silane modification step is a step of modifying the hydrogenated copolymer, obtained by the hydrogenation step, with silane.

Methods of modifying the hydrogenated copolymer with silane are not particularly limited. Introduction of an alkoxysilyl group can be accomplished for example by kneading the hydrogenated copolymer, an ethylenically unsaturated silane compound, and a peroxide in a twin-screw extruder. Kneading temperature is usually 180° C. or above, preferably 185° C. or above, more preferably 190° C. or above, usually 220° C. or below, preferably 210° C. or below, and more preferably 200° C. or below. Kneading time is usually 0.1 minutes or more, preferably 0.2 minutes or more, more preferably 0.3 minutes or more, and is usually 10 minutes or less, preferably 5 minutes or less, more preferably 2 minutes or less. Kneading and extrusion may be performed continuously while selecting the kneading temperature and kneading time as appropriate within the respective ranges above.

(Hydrogenated Copolymer-Containing Composition)

The disclosed hydrogenated copolymer-containing composition comprises the disclosed hydrogenated copolymer described above and at least any of a phosphorus antioxidant, a phenol anti-aging agent, and a processing aid, and optionally comprise other components.

<Phosphorous Antioxidants>

Phosphorous antioxidants are not particularly limited and examples include monophosphite compounds such as triphenylphosphite, diphenylisodesilicophosphite, phenyldiisodecylphosphite, tris(nonylphenyl)phosphite, tris(dinonylphenyl)phosphite, tris(2,4-di-t-butylphenyl)phosphite, and 10-(3,5-di-t-butyl-4-hydroxybenzyl)-9,10-dihydro-9-oxa-10-phosphaphenanthrene-10-oxide; diphosphite compounds such as 4,4'-butylidene-bis(3-methyl-6-t-butylphenyl-di-tridecylphosphite)4,4'-isopropylidene-bis(phenyl-di-alkyl (C12-C15)phosphite);
6-[3-(3-t-butyl-4-hydroxy-5-methylphenyl)propoxy]-2,4,8, 10-tetrakis-t-butyl dibenzo[d,f][1.3.2]dioxaphosphepine;
6-[3-(3,5-di-t-butyl-4-hydroxyphenyl)propoxy]-2,4,8,10-tetrakis-t-butyldibenzo[d,f][1.3.2]dioxaphosphepine. One of these may be used individually, or two or more of these may be used in combination in an arbitrary ratio.

<Phenol Anti-Aging Agents>

Phenol anti-aging agents are not particularly limited, and examples include pentaerythrityl tetrakis[3-(3,5-di-t-butyl-4-hydroxyphenyl)propionate], 2,2-thio-diethylene bis[3-(3, 5-di-t-butyl-4-hydroxyphenyl)propionate, octadecyl-3-(3,5-di-t-butyl-4-hydroxyphenyl)propionate, 3,9-bis {2-[3-(3-t-butyl-4-hydroxy-5-methylphenyl)proonyloxy]-1,1-dimethylethyl}-2,4,8,10-tetraoxaspiro[5,5]undecane, and 1,3,5-trimethyl-2,4,6-tris (3,5-di-t-butyl-4-hydroxybenzyl) benzene. One of these may be used individually, or two or more of these may be used in combination in an arbitrary ratio.

In the disclosed hydrogenated copolymer-containing composition, the total amount of the phosphorus antioxidant and the phenol anti-aging agent per 100 parts by mass of the hydrogenated copolymer is not particularly limited as long as it is 0.001 parts by mass or more and 1.0 part by mass or less, and is preferably 0.003 parts by mass or more, more preferably 0.005 parts by mass or more, and is preferably 0.8 parts by mass or less, and more preferably 0.5 parts by mass or less. When the total amount of the phosphorus antioxidant and the phenol anti-aging agent per 100 parts by mass of the hydrogenated copolymer is 0.001 parts by mass or more, oxidation can be prevented, and when the amount is 1.0 part by mass or less, bleeding to the resin surface can be prevented.

<Processing Aid>

Processing aids which can be uniformly dissolved or dispersed in the hydrogenated copolymer are preferred, with hydrocarbon polymers having a number-average molecular weight of 300 or more and 5,000 or less being more preferred.

Specific examples of hydrocarbon polymers include low molecular weight forms of polyisobutylene, polybutene, poly-4-methylpentene, poly-1-octene, polyisoprene, ethylene-α-olefin copolymers, polyisoprene-butadiene copolymers, and hydrogenated products thereof. One of these may be used individually, or two or more of these may be used in combination in an arbitrary ratio.

Of these, low molecular weight forms of hydrogenated polyisobutylene (HPB) with a number average molecular weight of preferably 500 or more, but preferably 3,000 or less, and more preferably 2,500 or less are preferred for transparency, light resistance and excellent softening effect.

The blending amount of hydrocarbon-based polymers having a low molecular weight is usually 40 parts by mass or less, preferably 30 parts by mass or less, more preferably 20 parts by mass or less, and still more preferably 15 parts by mass or less, per 100 parts by mass of the hydrogenated copolymer. When the blending amount of hydrocarbon-based polymers having a low molecular weight is within the above preferable range, in cases where an interlayer film for laminated glass is used, it is possible to prevent heat resistance reduction and increases in eluate.

<Other Components>

Other components are not particularly limited, and examples thereof include ultraviolet absorbers, light stabilizers, polymers other than hydrogenated block copolymers, anti-blocking agents for pellets, infrared blocking/absorbing agents, metal soaps, colorants, acid anhydrides, and inorganic oxides (e.g., pulverized silica, calcined silica) depending on the application. One of these may be used individually, or two or more of these may be used in combination in an arbitrary ratio.

The disclosed hydrogenated copolymers or hydrogenated copolymer-containing compositions are suitably used for interlayer films for laminated glass (laminated glass may include heat ray reflecting films, transparent conductive films, light control films, highly elastic resin layers and the like), sealing materials (e.g., solar power generation elements, OLEDs), optical films (e.g., retardation films, polarizing plate protective films), medical shaped articles (e.g., vials, syringes, infusion bags, culture container adhesives), adhesive sheets, and adhesives.

(Interlayer Film for Laminated Glass)

The disclosed interlayer film for laminated glass is an interlayer film used for laminated glass and comprises a modified product in which an alkoxysilyl group or acid anhydride group is introduced into the disclosed hydrogenated copolymer, and optionally comprise other components such as processing aids and ultraviolet absorbers (UVA).

In addition to the interlayer film for laminated glass, the laminated glass may include a heat ray reflecting film, a transparent conductive film, a light control film, a high elasticity resin layer, or the like.

Examples of articles to be bonded using the interlayer film for laminated glass include glass, plastics such as polycarbonate resins and acrylic resins.

Details and preferred examples of laminated glass are as described for example in WO2013/176258 and WO2016/006610.

<Modified Product with Introduced Alkoxysilyl Group>

Examples of alkoxysilyl groups include tri(C1-C6 alkoxy)silyl groups such as trimethoxysilyl group and triethoxysilyl group; (C1-C20 alkyl)di(C1-C6 alkoxy)silyl groups such as methyldimethoxysilyl group, methyldiethoxysilyl group, ethyldimethoxysilyl group, ethyldiethoxysilyl group, propyldimethoxysilyl group, and propyldiethoxysilyl group; and (aryl)di(C1-C6 alkoxy)silyl groups such as phenyldimethoxysilyl group, and phenyldiethoxysilyl group. Further, the alkoxysilyl group may be bonded to a hydrogenated block copolymer (D) via a divalent organic group such as an alkylene group having 1 to 20 carbon atoms or an alkylene oxycarbonylalkylene group having 2 to 20 carbon atoms.

The amount of an alkoxysilyl group introduced into the hydrogenated copolymer in the interlayer film for laminated glass is preferably 0.1 parts by mass or more, more preferably 0.2 parts by mass or more, it is more preferably 0.3 parts by mass or more, still more preferably 1.1 parts by mass or more, still more preferably 1.8 parts by mass or more, and preferably 10 parts by mass or less, more preferably 5 parts by mass or less, and still more preferably 3 parts by mass or less, per 100 parts by mass of the hydrogenated copolymer.

When the introduction amount of an alkoxysilyl group is equal to or higher than the above lower limit, adhesion can be improved, and on the other hand, when the introduction amount of an alkoxysilyl group is equal to or lower than the above upper limit, generation of foreign matters can be prevented.

Incorporation of an alkoxysilyl group can be confirmed by IR spectroscopy and the introduction amount can be calculated by $^1$H-NMR spectroscopy.

Methods of introducing an alkoxysilyl group into the hydrogenated copolymer are not particularly limited. Introduction can be accomplished for example by reacting the hydrogenated copolymer with an ethylenically unsaturated silane compound in the presence of an organic peroxide (grafting reaction).

Details and suitable examples of alkoxysilyl groups are as described for example in JP2017-159590A, WO2015/105127, WO2016/006610, WO2012/043708, WO2014/091941, and JP2017-171833.

<Modified Product with Introduced Acid Anhydride Group>

Methods of preparing a modified product with an introduced acid anhydride group are not particularly limited. For example, an acid anhydride group can be introduced by the grafting reaction of an unsaturated carboxylic anhydride with the hydrogenated copolymer in the presence of an organic peroxide.

Introduction of an acid anhydride group into the hydrogenated copolymer increase adhesion to thermoplastic resins.

Unsaturated carboxylic anhydrides used for the grafting reaction are not particularly limited as long as they introduce an acid anhydride group by the grafting reaction with the hydrogenated copolymer.

Unsaturated carboxylic anhydrides include maleic anhydride, citraconic anhydride, itaconic anhydride, 2,3-dimethylmaleic anhydride, 5-norbornene-2,3-dicarboxylic anhydride, allyl succinic anhydride, 2-phenylmaleic anhydride, and cis-aconitic anhydride. Among these, maleic anhydride, itaconic anhydride, and 5-norbornene-2,3-dicarboxylic anhydride are suitably used from the viewpoint of easy industrial availability. These unsaturated carboxylic anhydride product may be used individually or as a combination of two or more types.

Organic peroxides suitably used for the grafting reaction are those having a one-minute half-life temperature of 170° C. to 190° C.

Suitable examples of organic peroxides include t-butylcumyl peroxide, dicumyl peroxide, di-t-hexyl peroxide, 2,5-dimethyl-2,5-di(t-butylperoxy)hexane, di-t-butyl peroxide, and di(2-t-butylperoxyisopropyl)benzene.

These organic peroxides may be used alone or in combination.

The amount of the acid anhydride group introduced into the hydrogenated copolymer is preferably 0.1 parts by mass or more, more preferably 0.2 parts by mass or more, still more preferably 0.3 parts by mass or more, particularly preferably 1.8 parts by mass or more, and preferably 10 parts by mass or less, more preferably 5 parts by mass or less, and particularly preferably 3 parts by mass or less, per 100 parts by mass of the hydrogenated copolymer.

When the amount of the acid anhydride group introduced is equal to or lower than the upper limit, it is possible to prevent increases in moisture absorption of the obtained modified product to prevent corrosion. On the other hand, when the amount of the acid anhydride group introduced is equal to or higher than the lower limit, adhesion of the modified product layer to thermoplastic resin layers can be sufficiently developed.

Introduction of an acid anhydride group can be confirmed by IR spectroscopy and the introduction amount can be calculated from the absorbance of an IR spectrum.

The amount of the unsaturated acid anhydride used in the grafting reaction is preferably 0.1 parts by mass or more, more preferably 0.2 parts by mass or more, still more preferably 0.3 parts by mass or more, particularly preferably 1.8 parts by mass or more, and preferably 10 parts by mass or less, more preferably 5 parts by mass or less, and particularly preferably 3 parts by mass or less, per 100 parts by mass of the hydrogenated copolymer.

The amount of the organic peroxide to be used simultaneously is preferably 0.03 parts by mass or more, more preferably 0.05 parts by mass or more, particularly preferably 0.1 parts by mass or more, and preferably 1.5 parts by mass or less, more preferably 1.0 part by mass or less, and particularly preferably 0.5 parts by mass or less, per 100 parts by mass of the hydrogenated copolymer.

Methods of reacting the hydrogenated copolymer with an unsaturated carboxylic anhydride in the presence of a peroxide are not particularly limited. For example, introduction of an acid anhydride group can be accomplished by kneading a mixture of a hydrogenated block copolymer, an unsaturated carboxylic anhydride and a peroxide in a molten state in a twin-screw kneader for a desired time.

Details and preferred examples of acid anhydride groups are as described for example in JP2017-159590A.

<Processing Aid>

Processing aids used for the interlayer film for laminated glass are the same as those for the hydrogenated copolymer-containing composition. Likewise, preferred examples and addition amounts are the same as those for the hydrogenated copolymer-containing composition.

<Ultraviolet Absorber (UVA)>

Examples of ultraviolet absorbers (UVA) include benzotriazole and triazine UVAs, with benzotriazole UVAs being preferred in terms of light resistance.

The amount of the ultraviolet absorber (UVA) to be added is not particularly limited, and is preferably 0.01 parts by mass or more, more preferably 0.1 parts by mass or more, particularly preferably 0.2 parts by mass or more, and preferably 5 parts by mass or less, more preferably 2 parts by mass or less, and particularly preferably 1 part by mass or less, per 100 parts by mass of the hydrogenated copolymer. When the amount of the ultraviolet absorber (UVA) added is equal to or higher than the above lower limit, light resistance can be improved. When the amount of the ultraviolet absorber (UVA) added is equal to or lower than the above upper limit, bleeding out of the ultraviolet absorber (UVA) can be prevented.

The thickness of the interlayer film for laminated glass is not particularly limited, and is preferably 100 μm or more, more preferably 200 μm or more, particularly preferably 300 μm or more, and preferably 1,000 μm or less, more preferably 900 μm or less, and particularly preferably 800 μm or less. When the thickness of the interlayer film for laminated glass is equal to or more than the above lower limit, impact resistance can be improved. When the thickness of the interlayer film for laminated glass is equal to or less than the above upper limit, efficiency and easiness at the time of manufacturing laminated glass can be prevented from decreasing.

(Interlayer Film Laminate for Laminated Glass)

The disclosed interlayer film laminate for glass is an interlayer film laminate for laminated glass which comprises two or more laminated interlayer films for laminated glass, wherein at least one of the outermost layer is the disclosed interlayer film for laminated glass. The interlayer film laminate for laminated glass is for example an interlayer film laminate 300 for glass shown in FIG. 3A, an interlayer film laminate 310 for glass shown in FIG. 3B, an interlayer film laminate 320 for glass shown in FIG. 3C, an interlayer film laminate 330 for glass shown in FIG. 3D, or an interlayer film laminate 340 for glass shown in FIG. 3E. In FIGS. 3A to 3E, a layer formed of a hydrogenated copolymer is an HSIS layer 30, a layer formed of a modified product in which an alkoxysilyl group is introduced into a hydrogenated copolymer is an Si-HSIS layer 40, and a layer formed of a modified product in which an acid anhydride group is introduced into a hydrogenated copolymer is an acid anhydride group-modified HSIS layer 50.

Figure 3A:
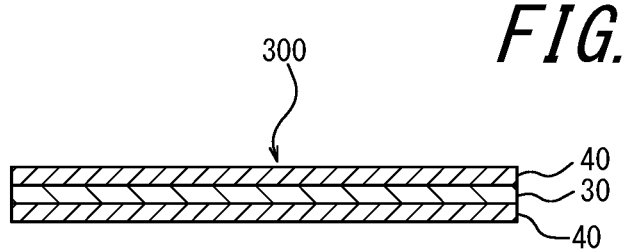
FIG. 3 depicts a first example of the disclosed interlayer laminate for laminated glass.
FIG. 3B depicts a second example of the disclosed interlayer laminate for laminated glass.
FIG. 3C depicts a third example of the disclosed interlayer laminate for laminated glass.
FIG. 3D depicts a fourth example of the disclosed interlayer laminate for laminated glass.
FIG. 3E depicts a fifth example of the disclosed interlayer laminate for laminated glass.
Figure 3B:
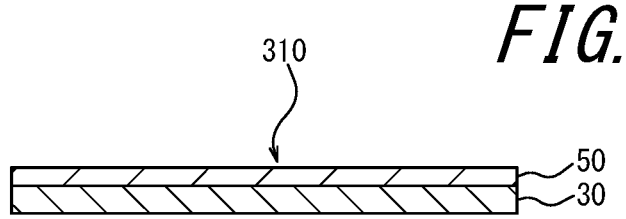
Figure 3C:
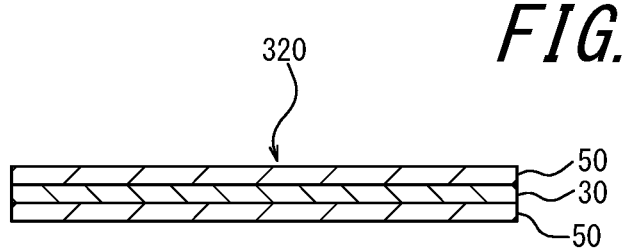
Figure 3D:
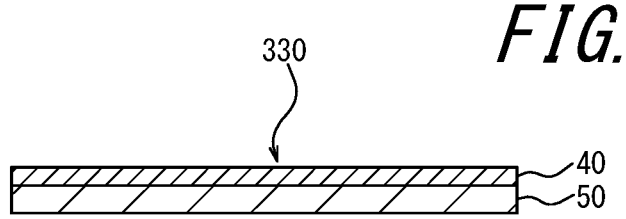
Figure 3E:
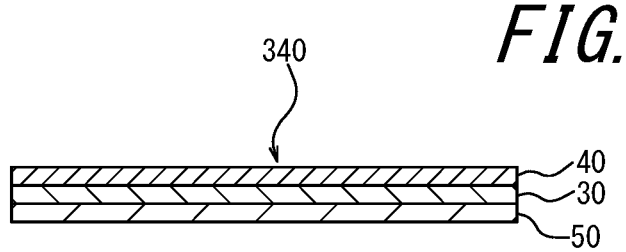

It is preferable that the disclosed interlayer film laminate for glass is configured such that one of the outermost layers is the Si-HSIS layer 40 and the other outermost layer is the acid anhydride group modified HSIS layer 50, like the interlayer film laminate 330 for glass shown in FIG. 3D and the interlayer film laminate 340 for glass shown in FIG. 3E.

The thickness of the interlayer film laminate for laminated glass is not particularly limited, and is preferably 100 μm or more, more preferably 200 μm or more, particularly preferably 300 μm or more, and preferably 1,000 μm or less, more preferably 900 μm or less, and particularly preferably 800 μm or less. When the thickness of the interlayer film laminate for laminated glass is equal to or more than the above lower limit, impact resistance can be improved. When the thickness of the interlayer film laminate for laminated glass is equal to or less than the above upper limit, efficiency and easiness at the time of manufacturing laminated glass can be prevented from decreasing.

(Sealing Material)

The disclosed sealing material comprises the disclosed hydrogenated copolymer or a modified product in which an alkoxysilyl group is introduced into the disclosed hydrogenated copolymer, and optionally comprises other components such as processing aids and ultraviolet absorbers (UVA).

The sealing material is not particularly limited, and specific examples include sealing materials for solar power generation elements, and sealing materials for OLEDs.

It is preferable that the sealing material has a multilayer structure comprising a layer made of the hydrogenated copolymer and a layer made of a modified product in which an alkoxysilyl group is introduced into the hydrogenated copolymer.

Details and preferred examples etc. of the sealing material are as described for example in WO2012/043708, WO2015/099079, and WO2014/091941.

<Modified Product with Alkoxysilyl Group Introduced>

The modified product into which an alkoxysilyl group in the sealing material is introduced is the same as that in the interlayer film for laminated glass, and preferred examples thereof are also the same as those for the interlayer film for laminated glass.

<Processing Aid>

Processing aids used for the sealing material are the same as those for the hydrogenated copolymer-containing composition. Likewise, preferred examples and addition amounts are the same as those for the hydrogenated copolymer-containing composition.

<Ultraviolet Absorber (UVA)>

Ultraviolet absorbers (UVAs) for the sealing material are the same as those for the interlayer film for laminated glass, and suitable examples and addition amounts are also the same as those for the interlayer film for laminated glass.

The thickness of the sealing material is not particularly limited, and is preferably 1 μm or more, more preferably 10 μm or more, particularly preferably 50 μm or more, and is preferably 10 mm or less, more preferably 1,000 μm or less, and particularly preferably 500 μm or less. When the thickness of the sealing material is equal to or more than the above-mentioned lower limit, it is possible to prevent the occurrence of defects in the sealing portion. When the thickness of the sealing material is equal to or less than the above-mentioned upper limit, it is possible to prevent reductions in efficiency when sealing.

(Optical Film)

The disclosed optical film comprises the disclosed hydrogenated copolymer and optionally comprises other components.

Specific examples of the optical film are not particularly limited, and include retardation films, and polarizing plate protective films.

Details and suitable examples of the optical film are described for example in WO2015/005292, WO2016/060070, and WO2015/002020.

(Medical Shaped Article)

The disclosed medical shaped article is formed of the disclosed hydrogenated copolymer-containing composition.

Specific examples of the medical shaped article are not particularly limited, and include vials, syringes, infusion bags, and culture container adhesives.

Details and preferred examples etc. of the medical shaped article are described for example in WO 2015/033876.

(Method of Producing Medical Shaped Article)

The disclosed method of producing a medical shaped article is a method of producing the medical shaped article and comprising irradiating a medical shaped article with high-energy radiation at an irradiation dose E, the medical shaped article formed from a hydrogenated copolymer-containing composition comprising W parts by mass as calculated using Equation 1 below or more and 0.50 parts by mass or less of a phenol anti-aging agent per 100 parts by mass of the hydrogenated copolymer:

$$W=[0.46\times(100-H)+0.04]\times(E/25) \qquad \text{Equation 1}$$

where W represents a part by mass of a phenol anti-aging agent per 100 parts by mass of a hydrogenated copolymer, H represents a percent hydrogenation of a hydrogenated copolymer expressed in units of percent, H is a numerical value of 99 to 100, and E represents an irradiation dose of high-energy radiation in units of kGy.

<Sterilization by High-Energy Radiation>

The disclosed method of producing a medical shaped article comprising irradiation the disclosed medical shaped article with high-energy radiation at an irradiation dose E.

To ensure a sterile condition, it is preferable to perform sterilization treatment by irradiating the medical shaped article with high-energy radiation with the medical shaped article being enclosed in a sealed container made of a resin film which does not allow bacteria to pass therethrough. The sterilized medical shaped article is then stored in the sealed container while maintaining a sterile condition until it is used.

Practically, a medical shaped article is put in a resin bag made of polyethylene or the like, the opening is sealed by heat sealing or the like, and the sealed bag is packaged in multiple layers by a bag made of resin film or the like, and then packaged in a cardboard box or a plastic case so that the medical shaped article can be transported, and the medical shaped article is sterilized by irradiation with high-energy radiation as it is.

The sealed container for enclosing therein the medical shaped article during sterilization by irradiation with high-energy radiation can be a single or multilayer bag or case made of resin. Examples of resins to be used include ethylene-vinyl alcohol copolymers, low-density polyethylene, high-density polyethylene, linear low-density polyethylene, polypropylene, ethylene-propylene copolymers, polycarbonate, polystyrene, polyvinyl chloride, polyvinylidene chloride, polyethylene terephthalate, polybutylene terephthalate, polyamide-6, polyamide-66, and polyamide-12. These resins may be used in combination of one or two or more thereof.

Sealing methods can be used in which the medical shaped article is enclosed in a resin bag or the like and the opening is heat-sealed.

When a film having an oxygen permeability of 100 cc/m$^2$·day·atm or less which is made of ethylene-vinyl alcohol copolymer, polyethylene terephthalate, polyamide-6 or the like is used the resin film constituting the sealed container and when sterilization treatment using high-energy ray irradiation is performed in a condition in which the oxygen concentration in the sealed container is lowered for example by enclosing a deoxygenating agent in the sealed container together with the medical shaped article, changes in pH due to the eluate from the medical shaped article into water after the sterilization treatment are advantageously further reduced.

High-energy radiation usable herein include X-rays, gamma rays, beta rays, electron beams, and neutron beams. Sterilization methods that involve irradiation with gamma rays or electron beams are particularly common and suitably used for sterilization.

For the sterilization treatment of the medical shaped article, the preferred dose of high-energy radiation is usually from 20 kGy to 35 kGy. If the dose is less than 20 kGy, the sterilization effect is not sufficient. If it is larger than 35 kGy, it requires longer irradiation time and there may be an increase in eluate from the medical shaped article made of a hydrogenated block copolymer after sterilization treatment.

Examples of sterilized medical shaped articles include liquid, powder or solid chemical containers such as injection drug containers, ampoules, infusion bags, solid drug containers, eye drops containers, infusion containers, test drug containers, and nutrition containers; sample containers such as blood sampling test tubes, blood collection tubes, and analyte containers; pipe materials such as infusion tubes, tubing, fittings, valves, and cocks; contact lens storage containers; and artificial organs and parts thereof, such as denture beds, artificial hearts, and artificial kidneys. Particularly preferred are infusion bags, nutrient containers, medicine bottles, ampoules, etc. used for storing drugs, in particular liquid drugs, because the amount of elution from the container is small.

Details of methods of producing medical shaped articles and preferred examples thereof are as described for example in WO2015/033876.

(Adhesive)

The disclosed adhesive comprises a modified product in which an alkoxysilyl group is introduced into the disclosed hydrogenated copolymer, and optionally further comprises organic solvents, silane coupling agents, crosslinking aids, organic peroxides, processing aids, and other agents.

The disclosed adhesive may bond a heat-resistant resin and a metal, and an adhesive sheet containing a disclosed adhesive and a thermoplastic resin sheet may be bonded.

Details and preferred examples of adhesives are as described for example in JP2017-171833A and WO2017/154718.

<Modified Product with Introduced Alkoxysilyl Group>

Modified products into which an alkoxysilyl group is introduced in the adhesive are the same as those for the interlayer film for laminated glass, and preferred examples thereof are also the same as those for the interlayer film for laminated glass.

<Organic Solvent>

Examples of organic solvents include aromatic solvents such as toluene, xylene, and solvent naphtha; saturated carbohydrate solvents such as decalin; alicyclic hydrocarbon solvents such as cyclohexane, methylcyclohexane, and dimethylcyclohexane; ether solvents such as tetrahydrofuran; terpene solvents such as limonene; ketone solvents such as cyclohexanone; and the like.

These organic solvents may be used alone, or two or more of them may be used in combination.

Toluene is preferred in terms of volatility of the solvent from the adhesive applied to the substrate and workability in the coating process.

The boiling point of the organic solvent is not particularly limited and is preferably 90° C. or above, more preferably 100° C. or above, particularly preferably 105° C. or above, and preferably 150° C. or below, more preferably 140° C. or below, and particularly preferably 130° C. or below. When the boiling-point point of the organic solvent is equal to or higher than the above lower limit, the organic solvent can be easily removed at the time of coating film forming. When the boiling point of the organic solvent is equal to or lower than the above upper limit, and adhesive layer can be formed homogeneously.

The amount of the organic solvent is not particularly limited and is preferably 100 parts by mass or more, more preferably 150 parts by mass or more, still more preferably 200 parts by mass or more, particularly preferably 300 parts by mass or more, and preferably 1,000 parts by mass or less, more preferably 800 parts by mass or less, particularly preferably 600 parts by mass or less, per 100 parts by mass of the modified product. When the amount of the organic solvent is equal to or higher than the above lower limit, coating can be performed stably. When the amount of the organic solvent is equal to or lower than the above upper limit, it is possible to shorten the drying time of the coating film.

<Silane Coupling Agent>

Silane coupling agents are not particularly limited. Preferred are epoxysilane coupling agents and aminosilane coupling agents, with epoxysilane coupling agents being particularly preferred.

Specific examples of epoxysilane coupling agents include 2-(3,4-epoxycyclohexyl)ethyltrimethoxysilane, 3-glycidoxypropyltrimethoxysilane, 3-glycidoxypropylmethyldimethoxysilane, and 3-glycidoxypropyltriethoxysilane.

Specific examples of aminosilane coupling agents include N-2-(aminoethyl)-3-aminopropylmethyldimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane. Of these, 3-glycidoxypropyltrimethoxysilane is preferred in terms of adhesion.

The amount of the silane coupling agent is not particularly limited, and is preferably 0.1 parts by mass or more, more preferably 0.2 parts by mass or more, still more preferably 0.5 parts by mass or more, particularly preferably 1.0 part by mass or more, and preferably 10 parts by mass or less, more preferably 5 parts by mass or less, particularly preferably 3 parts by mass or less, per 100 parts by mass of the modified product. When the amount of the silane coupling agent is equal to or higher than the above lower limit, adhesion can be improved. When the amount of the silane coupling agent is equal to or lower than the above upper limit, increases in viscosity with time of the adhesive can be prevented.

<Crosslinking Aid>

Examples of crosslinking aids include triallyl isocyanurate, polyvalent acrylic acid esters, and polyvalent methacrylic acid esters. Each of these crosslinking aids may be used alone, or two or more of them may be used in combination. Of these, triallyl isocyanurate is preferred from the viewpoint of improving adhesion.

The amount of the crosslinking aid is not particularly limited and is preferably 0.01 parts by mass or more, more preferably 0.1 parts by mass or more, still more preferably 1 part by mass or more, particularly preferably 2 parts by mass or more, and is preferably 5 parts by mass or less, more preferably 3 parts by mass or less, particularly preferably 2 parts by mass or less, per 100 parts by mass of the modified product. When the amount of the crosslinking aid is equal to or higher than the above lower limit, adhesion can be improved. When the amount of the crosslinking aid is equal to or lower than the above upper limit, increases in viscosity with time of the adhesive can be prevented.

<Organic Peroxide>

Examples of organic peroxides include 1,1-di(t-butylperoxy)-3,3,5-trimethylcyclohexane, 1,1-di(t-butylperoxy)-2-methylcyclohexane, 1,1-di(t-butylperoxy)cyclohexane, 2,5-dimethyl-2,5-di(benzoylperoxy)hexane, 2,2-di(t-butylperoxy)butane, n-butyl-4,4-di(t-butylperoxy)valerate, Examples thereof include t-butylperoxybenzoate, t-butylcumylperoxide, dicumylperoxide, 2,5-dimethyl-2,5-di(benzoylperoxy)hexane, 2,2-di(t-butylperoxy)butane, n-butyl-4,4-di(t-butylperoxy)valerate, t-butylperoxybenzoate, t-butylcumylperoxide, dicumylperoxide, di-t-hexylperoxide, 2,5-dimethyl-2,5-di(t-butylperoxy)hexane, di-t-butyl peroxide, t-butyl peroxyisobutyrate, lauroyl peroxide, dipropionyl peroxide, p-menthane hydroperoxide. Of these, 2,5-dimethyl-2,5-di(t-butylperoxy)hexane is preferred in terms of improvement in adhesion.

The amount of the organic peroxide is not particularly limited, and is preferably 0.01 parts by mass or more, more preferably 0.05 parts by mass or more, still more preferably 0.1 parts by mass or more, particularly preferably 0.2 parts by mass or more, and preferably 1 part by mass or less, more preferably 0.5 parts by mass or less, particularly preferably 0.3 parts by mass or less, per 100 parts by mass of the modified product. When the amount of the organic peroxide is equal to or higher than the above lower limit, adhesion can be improved. When the amount of the organic peroxide is equal to or lower than the above upper limit, increases in viscosity with time of the adhesive can be prevented.

<Processing Aid>

Processing aids used for the adhesive are the same as those for the hydrogenated copolymer-containing composition. Likewise, preferred examples and addition amounts are the same as those for the hydrogenated copolymer-containing composition.

<Adhesion Between Heat-Resistant Resin and Metal>

Examples of heat-resistant resins include those having heat deformation resistance which is usually 180° C. or higher, preferably 220° C. or higher, more preferably 260° C. or higher, such as polyimide resin, polyamide-imide resin, polyetherimide resin, aromatic polyamide resin, polyarylate resin, polyethersulfone resin, liquid crystal polymer, polyphenylene sulfide resin, bismaleimide resin, epoxy resin, unsaturated polyester resin. Heat deflection resistance can be evaluated by temperature of deflection under load as determined according to JIS K7191-1 (Plastics—Determination of temperature of deflection under load).

Specific examples of metals include such metals as aluminum, gallium, indium, titanium, vanadium, chromium, molybdenum, tungsten, manganese, iron, cobalt, nickel, palladium, platinum, copper, silver, gold, and zinc; alloys such as iron alloys, copper alloys, aluminum alloys, nickel alloys, solders, wood metals, super steel alloys, white gold alloys, and the like.

Heating temperature at the time of bonding is not particularly limited and is preferably 100° C. or above, more preferably 110° C. or above, particularly preferably 120° C. or above, and is preferably 200° C. or below, more preferably 190° C. or below, particularly preferably 180° C. or below. When the heating temperature at the time of bonding is equal to or higher than the above-mentioned lower limit, adhesion can be improved. When the heating temperature at the time of bonding is equal to or lower than the above-mentioned upper limit, warpage after bonding can be prevented.

(Assembly)

The disclosed assembly comprises: an adhesive sheet comprising the disclosed adhesive; and a thermoplastic resin sheet, wherein the adhesive sheet and the thermoplastic resin sheet are bonded together.

The thickness of the adhesive sheet comprising the disclosed adhesive is not particularly limited and is preferably 5 µm or more, more preferably 10 µm or more, particularly preferably 15 µm or more, and is preferably 100 µm or less, more preferably 80 µm or less, and particularly preferably 50 µm or less. When the thickness of the adhesive sheet is equal to or higher than the above lower limit, adhesion can be improved, and on the other hand, when the thickness of the adhesive sheet is equal to or lower than the above upper limit, the adhesive layer can be suppressed from protruding.

Suitable examples of thermoplastic resin sheets include polycarbonate resins, polyester resins, and (meth)acrylic ester (co)polymers for their excellent transparency and mechanical strength.

The thickness of the assembly of the present disclosure is not particularly limited and is preferably 0.02 mm or more, more preferably 0.1 mm or more, particularly preferably 0.2 mm or more, and is preferably 10 mm or less, more preferably 2 mm or less, particularly preferably 1 mm or less. When the thickness of the assembly is equal to or greater than the lower limit, it is possible to prevent breakage of the assembly. When the thickness of the assembly is equal to or less than the upper limit, it is possible to prevent the workability of the assembly from decreasing.

Details and preferred examples of the assembly are as described for example in WO2017/154718.

(Method of Producing Assembly)

The disclosed method of producing an assembly is a method of producing the disclosed assembly and comprises: (1) a step wherein a bonding surface of either an adhesive sheet or a thermoplastic resin sheet is subjected to at least one activation treatment selected from plasma irradiation, excimer ultraviolet irradiation, and corona discharge and (2) a step wherein the adhesive sheet and the thermoplastic resin sheet are compressed under pressure with their bonding surfaces facing each other.

Details, preferred examples, etc. of assembly production methods are as described for example in WO2017/154718.

<Step (1)>

Step (1) is a step of subjecting a bonding surface of either an adhesive sheet or a thermoplastic resin sheet to at least one activation treatment selected from plasma irradiation, excimer ultraviolet irradiation, and corona discharge. Plasma irradiation and/or corona discharge treatment are preferred because surface treatment can be performed uniformly.

<<Activation Treatment>>

The activation treatment is at least one selected from plasma irradiation, excimer ultraviolet irradiation, and corona discharge.

Plasma Irradiation

Examples of plasma irradiation include atmospheric pressure plasma irradiation in which plasma irradiation is performed under atmospheric pressure, and reduced pressure plasma irradiation in which plasma irradiation is performed under reduced pressure. From the viewpoint of uniformly performing surface treatment by a simpler method, atmospheric 1 pressure plasma irradiation is preferable.

Atmospheric plasma irradiation is preferably carried out at an atmospheric pressure under at least one gas atmosphere selected from hydrogen, helium, nitrogen, oxygen, and argon atmosphere, and is further preferably carried out at an atmospheric pressure under a mixed gas atmosphere of nitrogen and dry air or nitrogen and oxygen.

The flow rate of nitrogen is preferably 50 NL/min or more, and preferably 150 NL/min or less. The flow rate of dry air or oxygen is preferably 0.1 NL/min or more, and preferably 5 NL/min or less.

The output of plasma irradiation is preferably 0.5 kW or more, and preferably 2 kW or less.

The frequency of plasma irradiation is preferably a resonant frequency corresponding to the output. Specifically, the frequency is preferably 10 KHz or more and 100 KHz or less.

The irradiation rate of plasma irradiation is preferably 1 cm/min or more and 100 cm/min or less.

The distance between the plasma source and the adhesive sheet or thermoplastic resin sheet is preferably 1 mm or more and 10 mm or less.

When plasma irradiation is performed under reduced pressure, plasma treatment is preferably performed using a low-pressure gas (e.g., argon gas, oxygen gas, nitrogen gas, or mixed gas thereof,) having an absolute pressure of 0.001 kPa or more and 10 kPa or less.

The low-pressure gas is particularly preferably a mixed gas of nitrogen and oxygen.

The mixing ratio of nitrogen and oxygen is preferably 10:1 to 1:10 by volume, and the flow rate of the mixed gas is preferably 0.1 NL/min or more and 10 NL/min or less.

The output of plasma irradiation is preferably 50 W or more, and preferably 500 W or less.

Excimer Ultraviolet Radiation

Excimer ultraviolet irradiation is preferably performed using an excimer ultraviolet lamp while flowing a mixed gas of nitrogen and dry air or oxygen. The oxygen concentration of the mixed gas is usually 1% or more, preferably 3% or more, and is usually 15% or less, preferably 5% or less. The flow rate of the mixed gas is preferably 3 liters/min or more and 7 liters/min or less.

The distance between the excimer ultraviolet lamp and the adhesive surface with the adhesive sheet or thermoplastic resin sheet is preferably 10 mm or less, more preferably 1 mm or more and 5 mm or less. The intensity of irradiation is preferably 20 mW or more and 100 mW or less, and more preferably 30 mW or more and 50 mW or less.

—Corona Discharge—

Corona discharge is preferably performed in a dry air atmosphere, and the flow rate of the dry air is preferably 10 NL/min or more, and preferably 100 NL/min or less. The output of corona discharge is preferably 250 W or more, preferably 1,000 W or less, and the discharge power is preferably 20 W·min/m$^2$ or more, preferably 550 W·min/m$^2$ or less. The distance between the electrode and the adhesive sheet or thermoplastic resin sheet is preferably 1 mm or more, and preferably 20 mm or less.

<Step (2)>

Step (2) is a step wherein the adhesive sheet and the thermoplastic resin sheet are compressed under pressure with their bonding surfaces facing each other.

Methods of compressing the adhesive sheet and the thermoplastic resin sheet under pressure with their bonding surfaces facing with each other are not particularly limited. Examples include methods wherein the adhesive sheet, the thermoplastic resin sheet, and optionally other members are placed on top of one another to form a laminate, the laminate is placed into a flexible bag (hereinafter also "bag"), and the components are bonded together by heating while degassing the air in the bag; methods wherein the stack is placed in the bag, the air inside the bag is degassed, and then the components are bonded together by heating and pressurizing in an autoclave; and so forth.

In the case of pressurizing in an autoclave, the pressurizing pressure is usually 0.1 MPa or more, preferably 0.2 MPa or more, more preferably 0.3 MPa or more, and usually 1.5 MPa or less, preferably 1.2 MPa or less, and more preferably 1.0 MPa or less.

In the case of heating, the temperature is usually 80° C. or above, preferably 90° C. or above, and is usually 180° C. or below, preferably 160° C. or below, more preferably 140° C. or below.

When the temperature and pressure fall within the above ranges, sufficient adhesion can be obtained, and defects such as bubbles are less likely to occur on the bonding surface.

The pressurizing time in an autoclave is usually 10 minutes or more, preferably 15 minutes or more, more preferably 20 minutes or more, and is usually 60 minutes or less, preferably 50 minutes or less, and more preferably 40 minutes or less.

The method of forming an assembly by heating and pressurizing in a bag is particularly useful as a method of manufacturing an assembly having a curved surface shape such as laminated glass for automobiles or the like.

When the assembly is a planar object, a pressing machine such as a press, a vacuum laminator, a vacuum press, or a roll laminator can also be used for press-bonding.

The pressure at the time of pressurization is usually 0.1 MPa or more, preferably 0.5 MPa or more, and is usually 10 MPa or less, and preferably 3 MPa or less.

The time of pressurization is usually 1 minute or more, preferably 5 minutes or more, and is usually 30 minutes or less, preferably 10 minutes or less.

In the assembly obtained as described above, the interface between the adhesive sheet and the thermoplastic resin sheet is firmly bonded, so that even after exposure to a high temperature and high humidity environment for a long time, a strong adhesion is maintained and hence problems such as peeling are less likely to occur.

EXAMPLES

The following provides a more specific description of the present disclosure based on examples. However, the present disclosure is not limited to the following examples. In the following description, "%" and "parts" used in expressing quantities are by mass, unless otherwise specified.

In a polymer that is produced through copolymerization of two or more different monomers, the proportion of a structural unit in the polymer that is formed through polymerization of a monomer is normally, unless otherwise specified, the same as the ratio (charging ratio) of the given monomer among all the monomers used for the preparation of the polymer.

In the Examples and Comparative Examples, the weight-average molecular weight and molecular weight distribution, and GPC elution curve analysis of copolymers, the percent hydrogenation of hydrogenated copolymers, the weight-average molecular weight and GPC elution curve analysis (standard polystyrene-equivalent molecular weight based on the elution time of the first peak (first peak molecular weight), the standard polystyrene-equivalent molecular weight based on the elution time of the second peak (second peak molecular weight), the detection sensitivity (mV) of refractive index detector (RI) indicated by the peak top of the first peak (first peak top sensitivity), the detection sensitivity (mV) of refractive index detector (RI)

indicated by the peak top of the second peak (second peak sensitivity) of hydrogenated copolymers, the weight-average molecular weight and GPC elution curve analysis of silane-modified hydrogenated copolymers, mold printability of hydrogenated copolymers and silane-modified products thereof, film thickness unevenness upon film forming using hydrogenated copolymers and silane-modified products thereof, and adhesion strength to glass were evaluated by the methods described below.

<Weight-Average Molecular Weight and Molecular Weight Distribution of Copolymer and GPC Elution Curve Analysis>

A standard polystyrene-equivalent molecular weight was measured by gel permeation chromatography (GPC) using tetrahydro tetrahydrofuran as eluent at a flow rate of 0.6 cc/min at 40° C. HLC8320GPC (TOSOH CORPORATION) was used as a measurement device, with three columns (TSKgel SuperH G5000HLX, G4000HLX, and G2000HLX3) connected in series and the concentration adjusted to 4 mg polymer/cc.

<Percent Hydrogenation of Hydrogenated Copolymer>

Percent hydrogenation (mol %) of the hydrogenated copolymer was obtained by performing $^1$H-NMR spectroscopy (solvent: $CDCl_3$) to calculate the proportion of unsaturated bonds disappeared among the total unsaturated bonds present in the copolymer.

<Weight-Average Molecular Weight and GPC Elution Curve Analysis of Hydrogenated Copolymer>

A standard polystyrene-equivalent molecular weight was measured by gel permeation chromatography (GPC) using tetrahydro tetrahydrofuran as eluent at a flow rate of 0.6 cc/min at 40° C. HLC8320GPC (TOSOH CORPORATION) was used as a measurement device, with three columns (TSKgel SuperH G5000HLX, G4000HLX, and G2000HLX3) connected in series and the concentration adjusted to 4 mg polymer/cc.

<Weight-Average Molecular Weight and GPC Elution Curve Analysis of Silane-Modified Hydrogenated Copolymer>

A standard polystyrene-equivalent molecular weight was measured by gel permeation chromatography (GPC) using tetrahydro tetrahydrofuran as eluent at a flow rate of 0.6 cc/min at 40° C. HLC8320GPC (TOSOH CORPORATION) was used as a measurement device, with three columns (TSKgel SuperH G5000HLX, G4000HLX, and G2000HLX3) connected in series and the concentration adjusted to 4 mg polymer/cc.

Figure 2:
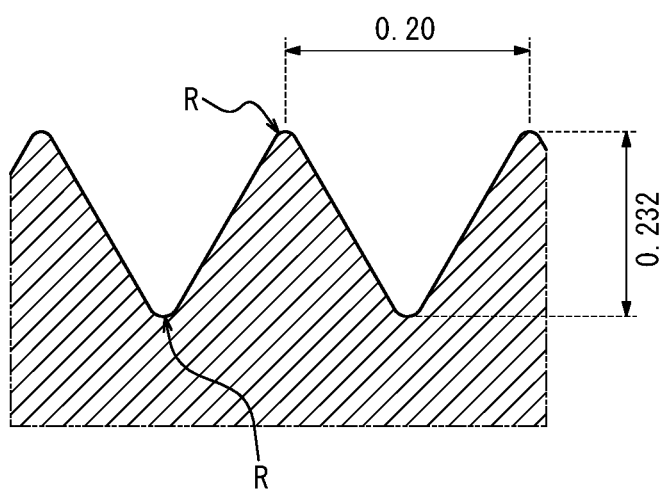
FIG. 2 depicts a cross-sectional view of a die for mold transfer evaluation.

<Mold Printability of Hydrogenated Copolymer and Silane-Modified Product Thereof Using vacuum heat pressurizer VS30-3030 (MIKADO-TECHNOS Co., Ltd.), a film extruded from a T die extruder was pre-heated at 170° C. for 1 minute at a reduced pressure of −100 kPa and pressed for 5 seconds at a pressure of 0.4 MPa. The mold used for the evaluation is shown in FIG. 2.

Using digital microscope VHX-1000A (KEYENCE CORPORATION), a cross-section of the obtained sample was observed and reference lines were drawn at two top heads to measure the depth of a valley. Mold printability (%) was calculated from the obtained measured result using the following equation:

Mold printability (%)=(measured valley depth/designed mold depth)×100

Mold printability is preferably close to 100%. It suffices that it falls within 90% to 105%.

<Film Thickness Unevenness when Forming Film Using Hydrogenated Copolymer and Silane-Modified Product Thereof>

Using a twin-screw extruder (KZW15TW-60MG-NH (100), manufactured by TECHNOVEL CORPORATION) fitted with a T die, a film having a target film thickness of 470 μm was formed under a thermal condition of 170° C., and the film thickness of the widthwise central portion of the elongated film being conveyed was continuously measured. As a measuring device, a spectroscopic interference variation type multilayer film thickness measuring machine SI-T10 (manufactured by KEYENCE CORPORATION) was used. Observation was performed within a range in which a period of film thickness was observed, and the maximum thickness tmax, the minimum thickness tmin, and the average thickness tave in the period were obtained. Film thickness unevenness (%) was calculated using the following equation:

Film thickness unevenness(%)=((tmax−tmin)/tave)×100

The evaluation criteria are as follows.
  A: Film thickness unevenness is within 15%
  B: Film thickness unevenness is 15% to 25%
  C: Film thickness unevenness is greater than 25% to 35%
  D: Film thickness unevenness is greater than 35%

<Adhesion Strength to Glass>

A cutter was used to make a 10 mm-width cut on the short side of the prepared glass laminate (substrate+resin sheet) of 50 mm×75 mm size until the substrate float glass was completely cut. One end of the cut was peeled out to the extent that it can be held by a chuck in a peeling test to prepare a tensile test sample. For measurement, opposing ends with uneven thickness were not used but a central portion with uniform thickness was used. Using a universal testing system (Instron 5580, manufactured by Instron Corporation), 180° peel test was performed at a tensile rate 100 mm/min with a test piece width of 10 mm in accordance with "180° peel" as specified in "JIS K 6854-2", and a value where an S—S curve was stable was recorded as peel strength. Evaluation criteria are as follows:
  A: 20 N/10 mm or more
  B: 10 N/10 mm to less than 20N/10 mm
  D: less than 10N/10 mm Production Example 1

To a reactor fully purged with nitrogen and fitted with a stirring device, 550 parts of dehydrated cyclohexane, 25 parts of dehydrated styrene, and 0.475 parts of n-butyl ether were charged, and 2.93 parts of n-butyllithium (15% n-hexane solution) was added while stirring at 60° C., thereby initiation polymerization. The polymerization reaction was carried out at 65° C. for 60 minutes. The polymerization addition rate at this time, determined by gas chromatography, was 99.9% Next, 50.0 parts of dehydrated isoprene was added, and stirring was continued for 40 minutes. The polymerization addition rate at this point was 99.6%. Thereafter, 25.0 parts of further dehydrated styrene was added and allowed to react for 60 minutes. The polymerization addition rate at the time was approximately 100%. 2.0 parts of methanol was added to stop the reaction.

The obtained block copolymer 1 was a triblock copolymer of S-I-S (styrene block-isoprene block-styrene block) configuration having a weight-average molecular weight (Mw) of 11,700, a standard polystyrene-equivalent molecular weight based on the elution time of the first peak (first peak molecular weight) of 12,400, and a molecular weight distribution (Mw/Mn) of 1.02.

Production Example 2

To a reactor fully purged with nitrogen and fitted with a stirring device, 550 parts of dehydrated cyclohexane, 25 parts of dehydrated styrene, and 0.475 parts of n-butyl ether were charged, and 2.34 parts of n-butyllithium (15% n-hexane solution) was added while stirring at 60° C., thereby initiating polymerization. The polymerization reaction was carried out at 65° C. for 60 minutes. The polymerization addition rate at this time, determined by gas chromatography, was 99.9% Next, 50.0 parts of dehydrated isoprene was added, and stirring was continued for 40 minutes. The polymerization addition rate at this point was 99.6%. Thereafter, 25.0 parts of further dehydrated styrene was added and allowed to react for 60 minutes. The polymerization addition rate at the time was approximately 100%. 2.0 parts of methanol was added to stop the reaction.

The obtained block copolymer 2 was a triblock copolymer of S-I-S (styrene block-isoprene block-styrene block) configuration having a weight-average molecular weight (Mw) of 15,300, a standard polystyrene-equivalent molecular weight based on the elution time of the first peak (first peak molecular weight) of 16,100, and a molecular weight distribution (Mw/Mn) of 1.03.

Production Example 3

To a reactor fully purged with nitrogen and fitted with a stirring device, 550 parts of dehydrated cyclohexane, 25 parts of dehydrated styrene, and 0.475 parts of n-butyl ether were charged, and 0.90 parts of n-butyllithium (15% n-hexane solution) was added while stirring at 60° C., thereby initiating polymerization. The polymerization reaction was carried out at 65° C. for 60 minutes. The polymerization addition rate at this time, determined by gas chromatography, was 99.9% Next, 50.0 parts of dehydrated isoprene was added, and stirring was continued for 40 minutes. The polymerization addition rate at this point was 99.6%. Thereafter, 25.0 parts of further dehydrated styrene was added and allowed to react for 60 minutes. The polymerization addition rate at the time was approximately 100%. 2.0 parts of methanol was added to stop the reaction.

The obtained block copolymer 3 was a triblock copolymer of S-I-S (styrene block-isoprene block-styrene block) configuration having a weight-average molecular weight (Mw) of 4,2900, a standard polystyrene-equivalent molecular weight based on the elution time of the first peak (first peak molecular weight) of 44,300, and a molecular weight distribution (Mw/Mn) of 1.03.

Production Example 4

To a reactor fully purged with nitrogen and fitted with a stirring device, 550 parts of dehydrated cyclohexane, 25 parts of dehydrated styrene, and 0.475 parts of n-butyl ether were charged, and 0.47 parts of n-butyllithium (15% n-hexanoic solution) was added while stirring at 60° C., thereby initiating polymerization. The polymerization reaction was carried out at 65° C. for 60 minutes. The polymerization addition rate at this time, determined by gas chromatography, was 99.9% Next, 50.0 parts of dehydrated isoprene was added, and stirring was continued for 40 minutes. The polymerization addition rate at this point was 99.6%. Thereafter, 25.0 parts of further dehydrated styrene was added and allowed to react for 60 minutes. The polymerization addition rate at the time was approximately 100%. 2.0 parts of methanol was added to stop the reaction.

The obtained block copolymer 4 was a triblock copolymer of S-I-S (styrene block-isoprene block-styrene block) configuration having a weight-average molecular weight (Mw) of 93,100, a standard polystyrene-equivalent molecular weight based on the elution time of the first peak (first peak molecular weight) of 95,100, and a molecular weight distribution (Mw/Mn) of 1.06.

Example 1

The polymer solution prepared in Production Example 2 was transferred to a pressure-resistant reaction vessel equipped with a stirring device, and 4 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 180° C. in a state in which the reaction was 2 MPa pressurized by a gauge pressure. Once the internal temperature of the pressure-resistant reaction vessel reached 180° C., the temperature was kept at 180° C. without supplying hydrogen for 15 minutes. After 15 minutes, the hydrogen pressure was raised to 4.5 MPa and the hydrogenation reaction was carried out for 5 hours (percent hydrogenation: 99.8%). In the GPC elution curve of the hydrogenated copolymer after the hydrogenation reaction, the standard polystyrene-equivalent molecular weight based on the elution time of the first peak (first peak molecular weight) was 16,400, the standard polystyrene-equivalent molecular weight (second peak molecular weight) based on the elution time of the second peak was 1,200, the molecular weight distribution (Mw/Mn) was 2.16, and the weight-average molecular weight (Mw) was 15,200. The first peak molecular weight/the second peak molecular weight was 13.67, the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 26.39, and wA:wB=50:50.

The obtained hydrogenated copolymer was evaluated for mold printability and film thickness unevenness upon film forming. The results are shown in Table 1.

Example 2

The polymer solution prepared in Production Example 3 was transferred to a pressure-resistant reaction vessel equipped with a stirring device, and 5 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 180° C. in a state in which the reaction was 2 MPa pressurized by a gauge pressure. Once the internal temperature of the pressure-resistant reaction vessel reached 180° C., the temperature was kept at 180° C. without supplying hydrogen for 20 minutes. After 20 minutes, the hydrogen pressure was raised to 4.5 MPa and the hydrogenation reaction was carried out for 6 hours (percent hydrogenation: 99.5%). In the GPC elution curve of the hydrogenated copolymer after the hydrogenation reaction, the standard polystyrene-equivalent molecular weight based on the elution time of the first peak (first peak molecular weight) was 45,000, the standard polystyrene-equivalent molecular weight (second peak molecular weight) based on the elution time of the second peak was 23,500, the molecular weight distribution (Mw/Mn) was 1.66, and the weight-average molecular weight (Mw) was 37,800. The first peak molecular weight/the second peak molecular weight was 1.91, the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 4.01, and wA:wB=50:50.

Further, the obtained hydrogenated copolymer was evaluated for mold printability and film thickness unevenness upon film forming. The results are shown in Table 1.

Example 3

The polymer solution prepared in Production Example 3 was transferred to a pressure-resistant reaction vessel equipped with a stirring device, and 4 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 180° C. in a state in which the reaction was 2 MPa pressurized by a gauge pressure. Once the internal temperature of the pressure-resistant reaction vessel reached 180° C., the temperature was kept at 180° C. without supplying hydrogen for 60 minutes. After 60 minutes, the hydrogen pressure was raised to 4.5 MPa and the hydrogenation reaction was carried out for 6 hours (percent hydrogenation: 99.9%). In the GPC elution curve of the hydrogenated copolymer after the hydrogenation reaction, the standard polystyrene-equivalent molecular weight based on the elution time of the first peak (first peak molecular weight) was 45,000, the standard polystyrene-equivalent molecular weight (second peak molecular weight) based on the elution time of the second peak was 9,200, the molecular weight distribution (Mw/Mn) was 1.45, and the weight-average molecular weight (Mw) was 43,900. The first peak molecular weight/the second peak molecular weight was 4.89, the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 10.18, and wA:wB=50:50.

Further, the obtained hydrogenated copolymer was evaluated for mold printability and film thickness unevenness upon film forming. The results are shown in Table 1.

Example 4

The polymer solution prepared in Production Example 3 was transferred to a pressure-resistant reaction vessel equipped with a stirring device, and 5 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 190° C. in a state in which the reaction was 2 MPa pressurized by a gauge pressure. Once the internal temperature of the pressure-resistant reaction vessel reached 190° C., the temperature was kept at 190° C. without supplying hydrogen for 70 minutes. After 70 minutes, the hydrogen pressure was raised to 4.5 MPa and the hydrogenation reaction was carried out for 6 hours (percent hydrogenation: 99.7%). In the GPC elution curve of the hydrogenated copolymer after the hydrogenation reaction, the standard polystyrene-equivalent molecular weight based on the elution time of the first peak (first peak molecular weight) was 45,000, the standard polystyrene-equivalent molecular weight (second peak molecular weight) based on the elution time of the second peak was 1,100, the molecular weight distribution (Mw/Mn) was 5.55, and the weight-average molecular weight (Mw) was 24,700. The first peak molecular weight/the second peak molecular weight was 40.91, the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 6.88, and wA:wB=50:50.

Further, the obtained hydrogenated copolymer was evaluated for mold printability and film thickness unevenness upon film forming. The results are shown in Table 1.

Example 5

The polymer solution prepared in Production Example 4 was transferred to a pressure-resistant reaction vessel equipped with a stirring device, and 6 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 200° C. in a state in which the reaction was 2 MPa pressurized by a gauge pressure. Once the internal temperature of the pressure-resistant reaction vessel reached 200° C., the temperature was kept at 200° C. without supplying hydrogen for 122 minutes. After 122 minutes, the hydrogen pressure was raised to 4.5 MPa and the hydrogenation reaction was carried out for 8 hours (percent hydrogenation: 97.2%). In the GPC elution curve of the hydrogenated copolymer after the hydrogenation reaction, the standard polystyrene-equivalent molecular weight based on the elution time of the first peak (first peak molecular weight) was 96,000, the standard polystyrene-equivalent molecular weight (second peak molecular weight) based on the elution time of the second peak was 1,300, the molecular weight distribution (Mw/Mn) was 5.55, and the weight-average molecular weight (Mw) was 51,800. The first peak molecular weight/the second peak molecular weight was 73.85, the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 2.33, and wA:wB=50:50.

Further, the obtained hydrogenated copolymer was evaluated for mold printability and film thickness unevenness upon film forming. The results are shown in Table 1.

Example 6

As described below, "Production of silane-modified hydrogenated copolymer" and "Preparation of glass laminate" were performed.

In the GPC elution curve of the silane-modified hydrogenated copolymer, the standard polystyrene-equivalent molecular weight based on the elution time of the first peak (first peak molecular weight) was 16,300, the standard polystyrene-equivalent molecular weight (second peak molecular weight) based on the elution time of the second peak was 1,200, the molecular weight distribution (Mw/Mn) was 2.23, the weight-average molecular weight (Mw) was 14,900. The first peak molecular weight/the second peak molecular weight was 13.58, and the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 25.02, and wA:wB=50:50.

Further, the silane-modified hydrogenated copolymer was evaluated for mold printability and film thickness unevenness upon film forming. The glass laminate (substrate+resin sheet) prepared using the silane-modified hydrogenated copolymer was evaluated for adhesion strength to glass. The results are shown in Table 1.

<Preparation of Silane-Modified Hydrogenated Copolymer>

To 100 parts of pellets of the hydrogenated copolymer obtained in Example 1 were added 2.0 parts of vinyltrimetrysilane and 0.2 parts of 2,5-dimethy-12,5-di(t-butylperoxy)hexane (PERHEXA® 25B ("PERHEXA" is a registered trademark in Japan, other counties, or both), manufactured by NOF CORPORATION) were added. The mixture was kneaded using twin-screw extruder KZW15TW-60MG-NH(100) TECHNOVEL CORPORATION) at a resin temperature of 200° C. for a kneading time of 60 seconds to 70 seconds. The obtained kneaded product was extruded into a strand, air-cooled, and cut by a pelletizer to afford 97 parts of pellets of an alkoxysilane-modified product of the hydrogenated copolymer (alkoxysilane-modified product A).

Using the twin-screw extruder fitted with a T-die, pellets of the obtained alkoxysilane-modified product were formed into film having a target film thickness of 330 μm at 170° C. The elongated film being conveyed was cut to 50 mm×75 mm size (Table 2).

<Preparation of Glass Laminate (Substrate+Resin Sheet)>

The "elongated film (alkoxysilane-modified product [A], 50 mm×75 mm)" as a resin sheet and "float glass with standard thickness FL3 (predetermined dimension 50 mm×75 mm)" as a substrate were prepared, and the substrate and the resin sheet were bonded together to prepare a laminate (substrate+resin sheet). In order to remove the oil film and foreign matter attached on the surface of the glass sheet, float glass previously cleaned with an ultrasonic washer and dried was used as the substrate.

A Teflon®-glass cloth sheet ("Teflon" is a registered trademark in Japan, other countries, or both)) was placed in a vacuum laminator (PVL-1100, manufactured by Nisshinbo Mechatronics Co., Ltd.) having a hot plate heated to 150° C. and then the laminate (substrate+resin sheet) was placed with the hot plate side on the substrate surface. In addition, a Teflon®-glass cloth sheet was placed on the resin sheet surface of the laminate (substrate+resin sheet) placed in the vacuum laminator, and the chamber of the vacuum laminator was closed, and vacuum evacuation was started immediately. Time was measured from the start of the evacuation, and after the evacuation heating was performed for 5 minutes, the upper chamber was released to the atmosphere, and pressing was performed at 1 atm for 10 minutes for lamination. After 10 minute-pressing, the lower chamber was released to the atmosphere, and the laminate sample was taken out and cooled to room temperature to prepare a glass laminate (substrate+resin sheet).

Example 7

Except that the hydrogenated copolymer obtained in Example 3 was used in Example 6 instead of the hydrogenated copolymer obtained in Example 1, "preparation of silane-modified hydrogenated copolymer" and "preparation of glass laminate" were performed as in Example 6, the silane-modified product (alkoxysilane-modified product B) of the obtained hydrogenated copolymer was evaluated for mold printability and film thickness unevenness upon film forming, and the glass laminate (substrate+resin sheet) produced using the silane-modified product of the obtained hydrogenated copolymer was evaluated for adhesion strength to glass. The results are shown in Table 1.

In the GPC elution curve of the silane-modified hydrogenated copolymer, the standard polystyrene-equivalent molecular weight based on the elution time of the first peak (first peak molecular weight) was 45,100, the standard polystyrene-equivalent molecular weight (second peak molecular weight) based on the elution time of the second peak was 9,200, the molecular weight distribution (Mw/Mn) was 1.53, the weight-average molecular weight (Mw) was 44,100. The first peak molecular weight/the second peak molecular weight was 4.90, and the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 9.36, and wA:wB=50:50.

Comparative Example 1

The polymer solution prepared in Production Example 1 was transferred to a pressure-resistant reaction vessel equipped with a stirring device, and 4 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 190° C. in a state in which the reaction was 2 MPa pressurized by a gauge pressure. Once the internal temperature of the pressure-resistant reaction vessel reached 190° C., the temperature was kept at 190° C. without supplying hydrogen for 14 minutes. After 14 minutes, the hydrogen pressure was raised to 4.5 MPa and the hydrogenation reaction was carried out for 5 hours (percent hydrogenation: 99.8%). In the GPC elution curve of the hydrogenated copolymer after the hydrogenation reaction, the standard polystyrene-equivalent molecular weight based on the elution time of the first peak (first peak molecular weight) was 13,000, the standard polystyrene-equivalent molecular weight (second peak molecular weight) based on the elution time of the second peak was 900, the molecular weight distribution (Mw/Mn) was 2.21, and the weight-average molecular weight (Mw) was 10,400. The first peak molecular weight/the second peak molecular weight was 14.44, the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 29.74, and wA:wB=50:50.

Further, the obtained hydrogenated copolymer was evaluated for mold printability and film thickness unevenness upon film forming. The results are shown in Table 1.

Comparative Example 2

The polymer solution prepared in Production Example 3 was transferred to a pressure-resistant reaction vessel equipped with a stirring device, and 4 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 170° C. in a state in which the reaction was 2 MPa pressurized by a gauge pressure. Once the internal temperature of the pressure-resistant reaction vessel reached 170° C., the temperature was kept at 170° C. without supplying hydrogen for 20 minutes. After 20 minutes, the hydrogen pressure was raised to 4.5 MPa and the hydrogenation reaction was carried out for 7 hours (percent hydrogenation: 99.8%). In the GPC elution curve of the hydrogenated copolymer after the hydrogenation reaction, the standard polystyrene-equivalent molecular weight based on the elution time of the first peak (first peak molecular weight) was 45,000, the standard polystyrene-equivalent molecular weight (second peak molecular weight) based on the elution time of the second peak was 31,200, the molecular weight distribution (Mw/Mn) was 1.76, and the weight-average molecular weight (Mw) was 39,500. The first peak molecular weight/the second peak molecular weight was 1.44, the detection sensitivity (mV) of refractive index detector (RI) indicated by the peak top of the first peak (first peak top sensitivity)/the detection sensitivity (mV) of refractive index detector (RI) indicated by the peak top of the second peak (second peak top sensitivity) was 2.36, and wA:wB=50:50.

Further, the obtained hydrogenated copolymer was evaluated for mold printability and film thickness unevenness upon film forming. The results are shown in Table 1.

Comparative Example 3

Except that the hydrogenated copolymer obtained in Comparative Example 1 was used in Example 6 instead of the hydrogenated copolymer obtained in Example 1, "preparation of silane-modified hydrogenated copolymer" and "preparation of glass laminate" were performed as in Example 6, the silane-modified product (alkoxysilane-modified product C) of the obtained hydrogenated copolymer was evaluated for mold printability and film thickness unevenness upon film forming, and the glass laminate (substrate+resin sheet) produced using the silane-modified product of the obtained hydrogenated copolymer was evaluated for adhesion strength to glass. The results are shown in Table 1.

In the GPC elution curve of the silane-modified product of the hydrogenated copolymer, the standard polystyrene-equivalent molecular weight based on the elution time of the first peak (first peak molecular weight) was 12,900, the standard polystyrene-equivalent molecular weight (second peak molecular weight) based on the elution time of the second peak was 900, the molecular weight distribution (Mw/Mn) was 2.25, and the weight-average molecular weight (Mw) was 9,900. The first peak molecular weight/the second peak molecular weight was 14.33, and the detection sensitivity (mV) of refractive index detector (RI) indicated by the peak top of the first peak (first peak top sensitivity)/ the detection sensitivity of refractive index detector (RI) indicated by the detection sensitivity (mV) of the second peak (second peak top sensitivity) was 28.93, and wA:wB=50:50.

Example 8

A hydrogenated copolymer-containing composition A obtained by adding 0.1 parts of pentaerythritol tetrakis[3-(3,5-di-t-butyl-4-hydroxyphenyl)propionate] (Irganox® 1010 ("Irganox" is a registered trademark in Japan, other counties, or both), manufactured by BASF) which is a phenol antioxidant to 100 parts of the hydrogenated copolymer obtained in Example 3 was evaluated for mold printability and film thickness unevenness upon film forming in the same manner as in Example 3.

Example 9

The hydrogenated copolymer obtained in Example 3 was extruded at a resin temperature of 190° C. using a twin-screw extruder (TEM37BS, manufactured by Toshiba Machinery Co., Ltd.) equipped with a side feeder to which a liquid substance can be added, with hydrogenated polyisobutylene (HPB) (NOF Polybutene® 10SH ("NOF Polybutene" is a registered trademark in Japan, other counties, or both), manufactured by NOF CORPORATION) as a processing aid being continuously added from the side feeder at a proportion of 15 parts to 100 parts of the hydrogenated copolymer. The obtained kneaded product was extruded into a strand, water-cooled, and cut by a pelletizer to obtain pellets of the hydrogenated copolymer-containing composition B.

Further, in the same manner as in Example 3, the obtained hydrogenated copolymer-containing composition B was evaluated for mold printability and film thickness unevenness upon film forming.

Example 10

A hydrogenated copolymer composition was prepared in the same manner as in Example 9 except that the alkoxysilane-modified product B obtained in Example 7 was used instead of using the hydrogenated copolymer obtained in Example 3, and the obtained hydrogenated copolymer-containing composition C was evaluated for mold printability and film thickness unevenness upon film forming. Further, adhesion strength to glass was measured and evaluated using a glass laminate (substrate+resin sheet) prepared using the obtained hydrogenated copolymer-containing composition C.

In Table 1 shown below,

"First peak molecular weight" indicates the standard polystyrene-equivalent molecular weight based on the elution time of the first peak, "Second peak molecular weight" indicates the standard polystyrene-equivalent molecular weight based on the elution time of the second peak, "First peak top sensitivity (mV)" indicates the detection sensitivity (mV) of refractive index detector (RI) indicated by the peak top of the first peak, and "Second peak top sensitivity (mV)" indicates the detection sensitivity (mV) of refractive index detector (RI) indicated by the peak top of the second peak.

Production Example X

A block copolymer X was obtained in the same manner as in Production Example 3 except that the temperature was set to 75° C. when the second dehydrated styrene was added in Production Example 3.

The obtained block copolymer X was a triblock copolymer of S-I-S (styrene block-isoprene block-styrene block) configuration having a weight-average molecular weight (Mw) of 44,800, a standard polystyrene-equivalent molecular weight based on the elution time of the first peak (first peak molecular weight) of 85,800, and a molecular weight distribution (Mw/Mn) of 1.64.

Example 11

The polymer solution prepared in Production Example X was transferred to a pressure-resistant reaction vessel equipped with a stirring device, and 5 parts of a silica alumina-supported nickel catalyst as a hydrogenation catalyst (T-8400RL, manufactured by Clariant Catalyst Co., Ltd., nickel content: 33%) and 100 parts of dehydrated cyclohexane were added and mixed. The inside of the reaction vessel was replaced with hydrogen gas at room temperature, and the temperature was raised to 180° C. in a state in which the reaction was 2 MPa pressurized by a gauge pressure. Once the internal temperature of the pressure-resistant reaction vessel reached 180° C., the temperature was kept at 180° C. without supplying hydrogen 20 minutes. After 20 minutes, the hydrogen pressure was raised to 4.5 MPa and the hydrogenation reaction was carried out for 6 hours to afford a hydrogenated copolymer (first peak molecular weight: 88,400, second peak molecular weight: 47,000, first peak molecular weight/second peak molecular weight: 1.88, molecular weight distribution (Mw/Mn): 1.96, weight-average molecular weight (Mw): 40,300, first peak top sensitivity (mV): 4.3, second peak top sensitivity (mV): 112.7, first peak top sensitivity (mV)/second peak top sensitivity (mV): 0.04, percent hydrogenation: 99.9%, wA:wB=50:50). Further, the obtained hydrogenated copolymer was evaluated for mold printability and film thickness unevenness upon film forming. The results are shown in Table 1.

Example 12

Except that the hydrogenated copolymer obtained in Example 11 was used instead of the hydrogenated copolymer obtained Example 1 and the amount of vinyltrimethoxysilane added was changed from 2.0 parts to 1.8 parts in Example 6, "preparation of silane-modified hydrogenated copolymer" and "preparation of glass laminate" were performed as in Example 6. The silane-modified product (alkoxysilane-modified product D, first peak molecular weight: 88,100, second peak molecular weight: 47,100, first peak molecular weight/second peak molecular weight: 1.87, molecular weight distribution (Mw/Mn): 2.05, weight-average molecular weight (Mw): 39,700, first peak top sensitivity (mV): 3.4, second peak top sensitivity (mV): 101.7, first peak top sensitivity (mV)/second peak top sensitivity (mV): 0.03, percent hydrogenation: 99.9%, wA:wB=50:50) of the obtained hydrogenated copolymer was evaluated for mold printability and film thickness unevenness upon film forming, and the glass laminate (substrate+resin sheet) produced using the silane-modified product of the obtained hydrogenated copolymer was evaluated for adhesion strength to glass. The results are shown in Table 1.

TABLE 1

| | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Hydrogenation conditions | Polymer production example | 2 | 3 | 3 | 3 | 4 | 2 | 3 | 1 |
| | Organonickel catalyst (parts by mass) | 4 | 5 | 4 | 5 | 6 | 4 | 4 | 4 |
| | Hydrogen stop time after reaching hydrogenation reaction temp. (min) | 15 | 20 | 60 | 70 | 122 | 15 | 60 | 14 |
| | Hydrogenation temp. (° C.) | 180 | 180 | 180 | 190 | 200 | 180 | 180 | 190 |
| | Reaction time (hr) | 5 | 6 | 6 | 6 | 8 | 5 | 6 | 5 |
| Hydrogenated copolymer | Silane modification | Not performed | Not performed | Not performed | Not performed | Not performed | Performed | Performed | Not performed |
| | First peak molecular weight | 16400 | 45000 | 45000 | 45000 | 96000 | 16300 | 45100 | 13000 |
| | Second peak molecular weight | 1200 | 23500 | 9200 | 1100 | 1300 | 1200 | 9200 | 900 |
| | First peak molecular weight/Second peak molecular weight | 13.67 | 1.91 | 4.89 | 40.91 | 73.85 | 13.58 | 4.90 | 14.44 |

TABLE 1-continued

|  |  |  |  |  |  |  |  |  |  |
|---|---|---|---|---|---|---|---|---|---|
|  | First peak top sensitivity (mV) | 121.4 | 101.0 | 115.5 | 110.0 | 88.2 | 120.1 | 114.2 | 122.2 |
|  | Second peak top sensitivity (mV) | 4.6 | 25.2 | 11.3 | 16.0 | 37.8 | 4.8 | 12.2 | 4.1 |
|  | First peak top sensitivity (mV)/Second peak top sensitivity (mV) | 26.39 | 4.01 | 10.18 | 6.88 | 2.33 | 25.02 | 9.36 | 29.74 |
| Other components | Pentaerythrityl tetrakis[3-(3,5-di-t-butyl-4-hydroxyphenyl) propionate] (parts by mass per 100 parts by mass of hydrogenated copolymer) | 0 | 0 | 0 | 0 | 0 | 0 | 0 | 0 |
|  | Hydrogenated polyisobutylene (parts by mass per 100 parts by mass of hydrogenated copolymer or silane-modified product thereof) | 0 | 0 | 0 | 0 | 0 | 0 | 0 | 0 |
| Mold printability (%) |  | 104 | 95 | 99.9 | 100 | 92 | 106 | 102 | 190 |
| Film thickness unevenness |  | A | B | A | B | B | A | A | D |
| Adhesion strength to glass |  | — | — | — | — | — | B | A | — |

|  |  | Comp. Ex. 2 | Comp. Ex. 3 | Ex. 8 | Ex. 9 | Ex. 10 | Ex. 11 | Ex. 12 |
|---|---|---|---|---|---|---|---|---|
| Hydrogenation conditions | Polymer production example | 3 | 1 | 3 | 3 | 3 | X | X |
|  | Organonickel catalyst (parts by mass) | 4 | 4 | 4 | 4 | 4 | 5 | 5 |
|  | Hydrogen stop time after reaching hydrogenation reaction temp. (min) | 20 | 14 | 60 | 60 | 60 | 20 | 20 |
|  | Hydrogenation temp. (° C.) | 170 | 190 | 180 | 180 | 180 | 180 | 180 |
|  | Reaction time (hr) | 7 | 5 | 6 | 6 | 6 | 6 | 6 |
| Hydrogenated copolymer | Silane modification | Not performed | Performed | Not performed | Not performed | Performed | Performed | Performed |
|  | First peak molecular weight | 45000 | 12900 | 45000 | 45000 | 45100 | 88400 | 88100 |
|  | Second peak molecular weight | 31200 | 900 | 9200 | 9200 | 9200 | 47000 | 47100 |
|  | First peak molecular weight/Second peak molecular weight | 1.44 | 14.33 | 4.89 | 4.89 | 4.90 | 1.88 | 1.87 |
|  | First peak top sensitivity (mV) | 88.0 | 121.5 | 115.5 | 115.5 | 114.2 | 4.3 | 3.4 |
|  | Second peak top sensitivity (mV) | 37.3 | 4.2 | 11.3 | 11.3 | 12.2 | 112.7 | 101.7 |

TABLE 1-continued

| | | | | | | | | |
|---|---|---|---|---|---|---|---|---|
| | First peak top sensitivity (mV)/Second peak top sensitivity (mV) | 2.36 | 28.93 | 10.18 | 10.18 | 9.36 | 0.04 | 0.03 |
| Other components | Pentaerythrityl tetrakis[3-(3,5-di-t-butyl-4-hydroxyphenyl)propionate] (parts by mass per 100 parts by mass of hydrogenated copolymer) | 0 | 0 | 0.1 | 0 | 0 | 0 | 0 |
| | Hydrogenated polyisobutylene (parts by mass per 100 parts by mass of hydrogenated copolymer or silane-modified product thereof) | 0 | 0 | 0 | 15 | 15 | 0 | 0 |
| Mold printability (%) | | 88 | 200 | 100 | 100 | 102 | 102 | 102 |
| Film thickness unevenness | | C | D | A | A | A | B | B |
| Adhesion strength to glass | | — | D | — | — | A | — | B |

TABLE 2

| | | Ex. 6 | Ex. 7 | Comp. Ex. 3 | Ex. 10 | Ex. 12 |
|---|---|---|---|---|---|---|
| Production of silane-modified product | Hydrogenated copolymer used | Ex. 1 | Ex. 3 | Comp. Ex. 1 | Ex. 3 | Ex. 11 |
| | 2,5-dimethyl-2,5-di(t-butylperoxy)hexane (parts) | 0.2 | 0.2 | 0.2 | 0.2 | 0.2 |
| | Vinyltrimethoxysilane (parts) | 2.0 | 2.0 | 2.0 | 2.0 | 1.8 |
| | Alkoxysilane modifying reaction temp. (° C.) | 200 | 200 | 200 | 200 | 200 |
| | Film forming temp. (° C.) | 170 | 170 | 170 | 170 | 170 |
| | Silane-modified product | A | B | C | B | D |
| Other components | Pentaerythrityltetrakis[3-(3,5-di-t-butyl-4-hydroxyphenyl)propionate] (parts by mass per 100 parts by mass of hydrogenated copolymer) | 0 | 0 | 0 | 0 | 0 |
| | Hydrogenated polyisobutylene (parts by mass per 100 parts by mass of hydrogenated copolymer or silane-modified product thereof) | 0 | 0 | 0 | 15 | 0 |
| Production of glass laminate | Press pressure (atmospheric pressure) | 1 | 1 | 1 | 1 | 1 |
| | Press hot plate temp. (° C.) | 150 | 150 | 150 | 150 | 150 |
| | Press time (min) | 10 | 10 | 10 | 10 | 10 |

It can be seen from Table 1 that because Examples 1 to 10 used a hydrogenated copolymer (including a modified product thereof) having a peak derived from a hydrogenated copolymer (including a silane-modified product thereof)'s peak exhibiting a peak top with the earliest elution time (first peak) and a peak derived from a hydrogenated copolymer (including a silane-modified product thereof)'s peak exhibiting a peak top with the second earliest elution time (second peak) wherein the first peak molecular weight/second peak molecular weight is 1.50 or more and the second peak molecular weight is 1,000 or more, they can increase mold printability compared to Comparative Examples 1 to 3 which do not satisfy the above conditions and prevent film thickness unevenness upon film forming.

Further, it has been found that hydrogenated copolymers having the predetermined first and second peaks in an elution curve as measured by gel permeation chromatography (GPC) can be obtained by appropriately adjusting the weight-average molecular weight (Mw) and molecular weight distribution (Mw/Mn) of the copolymer subjected to the hydrogenation reaction, the hydrogenation temperature, hydrogenation reaction time, and hydrogen supply stop time in the hydrogenation reaction.

From Table 1, it was found that the glass laminates prepared using the modified product obtained by silane-modifying the copolymerized hydrogen obtained in Examples 1 and 3 (Examples 6, 7 and 10) had higher adhesion strength to glass than the glass laminate prepared using the modified product obtained by silane-modifying the hydrogenated copolymer obtained in Comparative Example 1 (Comparative Example 3).

Production Example 5

The hydrogenated copolymer obtained in Example 2 (first peak molecular weight/second peak molecular weight: 1.91, second peak molecular weight: 23,500, percent hydrogenation: 99.5%, wA:wB=50:50) was used as it is as composition 1 (see Table 2-2), and evaluation in the following Examples was performed.

Production Example 6

The hydrogenated copolymer obtained in Example 3 (first peak molecular weight/second peak molecular weight: 4.89, second peak molecular weight: 9,200, percent hydrogenation: 99.9%, wA:wB=50:50) was used as it is as composition 2 (see Table 2-2), and evaluation in the following Examples was performed.

Production Example 7

The hydrogenated copolymer obtained in Comparative Example 1 (first peak molecular weight/second peak molecular weight: 14.44, second peak molecular weight: 900, percent hydrogenation: 99.8%, wA:wB=50:50) was used as it is as composition 3 (see Table 2-2), and evaluation in the following Examples was performed.

Production Example 8

The hydrogenated copolymer obtained in Comparative Example 2 (first peak molecular weight/second peak molecular weight: 1.44, second peak molecular weight: 31,200, percent hydrogenation: 99.8%, wA:wB=50:50) was used as it is as Composition 4 (see Table 2-2), and evaluation in the following Examples was performed.

Production Example 9

Composition 5 (see TABLE 2-2) obtained by adding 15 parts of hydrogenated polyisobutylene (HPB) (NOF Polybutene® 10, manufactured by NOF CORPORATION) as a processing aid to 100 parts of the hydrogenated copolymer obtained in Example 3 (first peak molecular weight/second peak molecular weight: 4.89, second peak molecular weight: 9,200, percent hydrogenation: 99.9%, wA:wB=50:50) was evaluated in the following Examples.

Production Example 10

A silane-modified product (first peak molecular weight/second peak molecular weight: 13.58, second peak molecular weight: 1,200, percent hydrogenation: 99.5%, wA:wB=50:50) obtained as in Example 6 except that the amount of vinyltrimethoxysilane added was changed from 2.0 parts to 1.8 parts in Example 6 was used as it is as composition 6 (see Table 2-2), and evaluation in the following Examples was performed.

Production Example 11

A silane-modified product (first peak molecular weight/second peak molecular weight: 4.90, second peak molecular weight: 9,200, percent hydrogenation: 99.9%, wA:wB=50:50) obtained as in Example 7 except that the amount of vinyltrimethoxysilane added was changed from 2.0 parts to 1.8 parts in Example 7 was used as it is as composition 7 (see Table 2-2), and evaluation in the following Examples was performed.

Production Example 12

A silane-modified product (first peak molecular weight/second peak molecular weight: 4.90, second peak molecular weight: 9,200, percent hydrogenation: 99.9%, wA:wB=50:50) obtained in the same manner as in Example 7 except that the amount of vinyltrimethoxysilane added was changed from 2.0 parts to 1.1 parts in Example 7 was used as composition 8 as it is (see Table 2-2), and evaluation in the following Examples was performed.

Production Example 13

Composition 9 (see TABLE 2-2) obtained by adding 15 parts of hydrogenated polyisobutylene (HPB) (NOF Polybutene® 10, manufactured by NOF CORPORATION) as a processing aid to 100 parts of a silane-modified product (first peak molecular weight/second peak molecular weight: 4.90, second peak molecular weight: 9,200, percent hydrogenation: 99.9%, wA:wB=50:50) obtained as in Example 7 except that the amount of vinyltrimethoxysilane added was changed from 2.0 parts to 1.8 parts in Example 7 was evaluated in the following Examples.

Production Example 14

A silane-modified product (first peak molecular weight/second peak molecular weight: 14.33, second peak molecular weight: 900, percent hydrogenation: 99.8%, wA:wB=50:50) obtained as in Example 7 except that the amount of vinyltrimethoxysilane added was changed from 2.0 parts to 1.8 parts in Comparative Example 3 was used as composition 10 (see Table 2-2) as it is, and evaluation in the Examples described later was performed.

Production Example 15

A silane-modified product (first peak molecular weight/second peak molecular weight: 5.05, second peak molecular weight: 9,100, percent hydrogenation: 99.9%, wA:wB=50:50) obtained in the same manner as in Example 7 except that the following "preparation of modified hydrogenated copolymer" was performed instead of "preparation of silane modified copolymer" was used as it is as Composition 11 (see Table 2-2), and evaluation in the following Examples was performed.

<Preparation of Modified Hydrogenated Copolymer>

1.8 parts of maleic anhydride and 0.2 parts of 2,5-dimethyl-2,5-di(t-butylperoxy)hexane ("PERHEXA® 25B" manufactured by NOF CORPORATION) were added to 100 parts of pellets of the hydrogenated copolymer obtained in Example 3 (first peak molecular weight/second peak molecular weight: 4.89, second peak molecular weight: 9,200, percent hydrogenation: 99.9%, wA:wB=50:50). This mixture was kneaded using a twin-screw extruder (KZW15TW-60MG-NH(100), manufactured by TECH-NOVEL CORPORATION) at a resin temperature of 200° C. for a kneading time of 60 seconds to 70 seconds. The obtained kneaded product was extruded into a strand, air-cooled, and cut by a pelletizer to obtain 96 parts of pellets of a modified hydrogenated copolymer.

Production Example 16

A modified product obtained in the same manner as in Comparative Example 3 (first peak molecular weight/second peak molecular weight: 14.53, second peak molecular weight: 900, percent hydrogenation: 99.8%) except that "Preparation of modified hydrogenated copolymer" described below was performed instead of performing "Production of silane-modified hydrogenated copolymer" in Comparative Example 3 was used as it is as composition 12 (see Table 2-2).

<Preparation of Modified Hydrogenated Copolymer>

1.8 parts of maleic anhydride and 0.2 parts of 2,5-dimethyl-2,5-di(t-butylperoxy)hexane ("PERHEXA® 25B" manufactured by NOF CORPORATION) were added to 100 parts of pellets of the hydrogenated copolymer obtained in Comparative Example 1 (first peak molecular weight/second peak molecular weight: 14.44, second peak molecular weight: 900, percent hydrogenation: 99.8%, wA:wB=50:50). This mixture was kneaded using a twin-screw extruder (KZW15TW-60MG-NH(100), manufactured by TECH-NOVEL CORPORATION) at a resin temperature of 200° C. for a kneading time of 60 seconds to 70 seconds. The obtained kneaded product was extruded into a strand, air-cooled, and cut by a pelletizer to obtain 96 parts of pellets of a modified hydrogenated copolymer.

Production Example 17

Composition 13 (see Table 2-2) obtained by adding 0.1 parts of pentaerythritol tetrakis[3-(3,5-di-t-butyl-4-hydroxyphenyl)propionate] (Irganox® 1010, manufactured by BASF) as a phenol anti-aging agent (antioxidant) to 100 parts of the hydrogenated copolymer obtained in Example 3 (first peak molecular weight/second peak molecular weight: 4.89, second peak molecular weight: 9,200, percent hydrogenation: 99.9%, wA:wB=50:50) was evaluated in the following Examples.

Production Example 18

Composition 14 (see Table 2-2) obtained by adding 0.55 parts of pentaerythritol tetrakis[3-(3,5-di-t-butyl-4-hydroxyphenyl)propionate] (Irganox® 1010, manufactured by BASF) as a phenol anti-aging agent (antioxidant) to 100 parts of the hydrogenated copolymer obtained in Example 3 (first peak molecular weight/second peak molecular weight: 4.89, second peak molecular weight: 9,200, percent hydrogenation: 99.9%, wA:wB=50:50) was evaluated in the following Examples.

Production Example 19

A polymer solution was obtained in the same manner as in Production Example 3 except that the temperature was changed to 75° C. when the second dehydrated styrene was added. The polymer solution prepared was transferred to a pressure-resistant reaction vessel equipped with a stirring device, and 5 parts of a silica alumina-supported nickel catalyst as a hydrogenation catalyst (T-8400RL, manufactured by Clariant Catalyst Co., Ltd.) and 100 parts of dehydrated cyclohexane were added and mixed. The inside of the reaction vessel was replaced with hydrogen gas at room temperature, and the temperature was raised to 180° C. in a state in which the reaction was 2 MPa pressurized by a gauge pressure. Once the internal temperature of the pressure-resistant reaction vessel reached 180° C., the temperature was kept at 180° C. without supplying hydrogen for 20 minutes. After 20 minutes, the hydrogen pressure was raised to 4.5 MPa and the hydrogenation reaction was carried out for 6 hours to prepare a hydrogenated polymer (first peak molecular weight/second peak molecular weight: 1.88, second peak molecular weight: 47,000, percent hydrogenation: 99.9%, wA:wB=50:50). The hydrogenated polymer was used as composition 15 (see Tale 2-2) as it is, and evaluation in the following Examples was performed.

Production Example 20

A modified product obtained in the same manner as in Production Example 10 (first peak molecular weight/second peak molecular weight: 1.87, second peak molecular weight: 47,000, percent hydrogenation: 99.9%, wA:wB=50:50) except that the hydrogenated copolymer prepared in Production Example 19 (first peak molecular weight/second peak molecular weight: 1.88, second peak molecular weight: 47,000, percent hydrogenation: 99.9%, wA:wB=50:50) was used instead of using the hydrogenated copolymer obtained in Example 1 (first peak molecular weight/second peak molecular weight: 13.58, second peak molecular weight: 1,200, percent hydrogenation: 99.5%, wA:wB=50:50) in Production Example 10 was used as it is as Composition 16 (see Table 2-2) and evaluation in Examples described later was performed.

Production Example 21

Composition 17 (see TABLE 2-2) obtained by adding 15 parts of hydrogenated polyisobutylene (HPB) (NOF Polybutene® 10, manufactured by NOF CORPORATION) as a processing aid to 100 parts of the modified product prepared in Production Example 20 (first peak molecular weight/ second peak molecular weight: 1.87, second peak molecular weight: 47,000, percent hydrogenation: 99.9%, wA:wB=50:50) was evaluated in the following Examples.

Production Example 22

Composition 18 (see Table 2-2) obtained by adding 0.10 parts of pentaerythritol tetrakis[3-(3,5-di-t-butyl-4-hydroxyphenyl)propionate] (Irganox® 1010, manufactured by BASF) as a phenol anti-aging agent (antioxidant) to 100 parts of the hydrogenated copolymer obtained in Production Example 19 (first peak molecular weight/second peak molecular weight: 1.88, second peak molecular weight: 47,000, percent hydrogenation: 99.9%, wA:wB=50:50) was evaluated in the following Examples.

TABLE 2-2

| | Production Example 5 Composition 1 | Production Example 6 Composition 2 | Production Example 7 Composition 3 | Production Example 8 Composition 4 | Production Example 9 Composition 5 | Production Example 10 Composition 6 | Production Example 11 Composition 7 | Production Example 12 Composition 8 | Production Example 13 Composition 9 |
|---|---|---|---|---|---|---|---|---|---|
| First peak molecular weight/Second peak molecular weight | 1.91 | 4.89 | 14.44 | 1.44 | 4.89 | 13.58 | 4.90 | 4.90 | 4.90 |
| Second peak molecular weight | 23500 | 9200 | 900 | 31200 | 9200 | 1200 | 9200 | 9200 | 9200 |
| First peak top sensitivity (mV)/second peak top sensitivity (mV) | 4.01 | 10.18 | 29.74 | 2.36 | 10.18 | 25.02 | 9.36 | 9.32 | 9.36 |
| wA:wB | 50:50 | 50:50 | 50:50 | 50:50 | 50:50 | 50:50 | 50:50 | 50:50 | 50:50 |
| Percent hydrogenation | 99.5 | 99.9 | 99.8 | 99.8 | 99.9 | 99.5 | 99.9 | 99.9 | 99.9 |
| Block configuration | Triblock | Triblock | Triblock | Triblock | Triblock | Triblock | Triblock | Triblock | Triblock |
| Antioxidant amount (parts) | 0 | 0 | 0 | 0 | 0 | 0 | 0 | 0 | 0 |
| Processing aid amount (parts) | 0 | 0 | 0 | 0 | 15 | 0 | 0 | 0 | 15 |
| Alkoxysilyl group amount (parts) | N/A | N/A | N/A | N/A | N/A | 1.8 | 1.8 | 1.8 | 1.8 |
| Acid anhydride amount (parts) | N/A | N/A | N/A | N/A | N/A | N/A | N/A | N/A | N/A |

| | Production Example 14 Composition 10 | Production Example 15 Composition 11 | Production Example 16 Composition 12 | Production Example 17 Composition 13 | Production Example 18 Composition 14 | Production Example 19 Composition 15 | Production Example 20 Composition 16 | Production Example 21 Composition 17 | Production Example 22 Composition 18 |
|---|---|---|---|---|---|---|---|---|---|
| First peak molecular weight/Second peak molecular weight | 14.33 | 5.05 | 14.53 | 4.89 | 4.89 | 1.88 | 1.87 | 1.87 | 1.88 |
| Second peak molecular weight | 900 | 9100 | 900 | 9200 | 9200 | 47000 | 47100 | 47100 | 47000 |
| First peak top sensitivity (mV)/second peak top sensitivity (mV) | 27.59 | 9.44 | 27.71 | 10.18 | 10.5 | 0.04 | 0.03 | 0.03 | 0.04 |
| wA:wB | 50:50 | 50:50 | 50:50 | 50:50 | 50:50 | 50:50 | 50:50 | 50:50 | 50:50 |
| Percent hydrogenation | 99.8 | 99.9 | 99.8 | 99.9 | 99.9 | 99.9 | 99.9 | 99.9 | 99.9 |
| Block configuration | Triblock | Triblock | Triblock | Triblock | Triblock | Triblock | Triblock | Triblock | Triblock |
| Antioxidant amount (parts) | 0 | 0 | 0 | 0.10 | 0.55 | 0 | 0 | 0 | 0.10 |
| Processing aid amount (parts) | 0 | 0 | 0 | 0 | 0 | 0 | 0 | 15 | 0 |
| Alkoxysilyl group amount (parts) | 1.8 | N/A | N/A | N/A | N/A | N/A | 1.8 | 1.8 | N/A |
| Acid anhydride amount (parts) | N/A | 1.8 | 1.8 | N/A | N/A | N/A | N/A | N/A | N/A |

Example A1

As described below, "Preparation of interlayer film sheet for laminated glass", "Preparation of laminated glass", "Evaluation of adhesion strength after storage", "Evaluation of accuracy of adhesion strength after storage", and "Evaluation of impact resistance" were performed. The results are shown in Table 3.

<Preparation of Interlayer Film for Laminated Glass>

Composition 7 obtained in Production Example 11 was heated at 50° C. for 4 hours using a hot air dryer through which air was circulated to remove dissolved air. Using a T-die film melt extrusion molding machine (T-die width: 300 mm) with a resin melt extruder equipped with a 25 mm-diameter screw, Composition 7 was then extruded at a melting temperature of 200° C., a T die temperature of 200° C. and a roll temperature of 50° C. into a sheet having a thickness of 500 μm and a width of 280 mm to prepare an interlayer film sheet (500 μm) for laminated glass.

<Preparation of Laminated Glass>

The produced interlayer film sheet for laminated glass was sandwiched between two sheets of waterwhite glass having a thickness of 3.2 mm, a width of 200 mm and a length of 200 mm, and vacuum-degassed by a vacuum laminator at a temperature of 150° C. for 5 minutes, followed by vacuum pressure bonding for 5 minutes and then at 170° C. for a further 10 minutes to produce a laminated glass test piece having glass/interlayer film sheet/glass configuration.

<Evaluation of Adhesion Strength after Storage>

A laminated glass test piece for peel test was prepared by placing an interlayer film sheet on a sheet of waterwhite sheet glass having a thickness of 2 mm, a width of 75 mm, and a length of 65 mm with a non-adhesive portion provided at the end portion of the interlayer film sheet. Using a vacuum laminator (PVL0202S, manufactured by Nisshinbo Mechatronics, Inc.; hereinafter, this vacuum laminator is used) vacuum degassing was performed for 5 minutes at a temperature of 170° C., followed by vacuum pressure bonding for 10 minutes. The produced laminated glass test piece for peel test was stored in a high-temperature and high-humidity environment (85° C., 85% humidity) for 1,000 hours.

Adhesion strength after storage (average) and its accuracy (coefficient of variation) were evaluated by making a 10 mm-wide cut on the interlayer film sheet surface to providing five peeling portions per test piece, and performing a 180° peeling test based on JIS K 6854-2 at a peeling rate of 50 mm/min from the non-adhered portion of the interlayer film sheet for each peeling portion. The evaluation criteria are as follows:

<<Evaluation Criteria for Adhesion Strength>>
A: 30 N/cm or more
B: 25 N/cm or more and less than 30 N/cm
C: 20 N/cm or more and less than 25 N/cm
D: less than 20 N/cm <<Evaluation Criteria for Accuracy>>>
A: 2% or less
B: greater than 2% and 5% or less
C: greater than 5% and 10% or less
D: greater than 10%

<Evaluation of Impact Resistance>

The prepared laminated glass test piece was stored in a constant temperature and humidity chamber for 3 hours at −40° C. and taken out from the chamber. Immediately thereafter, a steel ball weighing 2 kg was dropped on the glass surface from a height of 2 m with reference to the method specified in JIS R 3212. The test piece was visually checked for cracking and impact resistance was evaluated based on the following evaluation criteria:

<<Evaluation Criteria>>
A: Steel ball does not penetrate through the test piece and glass fragments do not fall off.
B: Steel ball does not penetrate through the test piece and some glass fragments fall off
C: Steel ball does not penetrate through the test piece and numerous glass fragments fall off
D: Steel ball penetrates through the test piece

Example A2

"Preparation of interlayer film sheet for laminated glass", "Preparation of laminated glass", "Evaluation of adhesion strength after storage", "Evaluation of accuracy of adhesion strength after storage" and "Evaluation of impact resistance" were carried out in the same manner as in Example A1 except that Composition 8 obtained in Production Example 12 was used instead of using Composition 7 obtained in Production Example 11 in Example A1. The results are shown in Table 3.

Example A3

"Preparation of interlayer film sheet for laminated glass", "Evaluation of adhesion strength after storage", "Evaluation of accuracy of adhesion strength after storage" and "Evaluation of impact resistance" were carried out in the same manner as in Example A1 except that laminated glass having the configuration plastic/interlayer film sheet/plastic was produced by performing "Preparation of laminated glass" shown below using composition 11 obtained in Production Example 15 instead of producing laminated glass having the configuration glass/interlayer film sheet/glass using composition 7 obtained in Production Example 11. The results are shown in Table 3.

<Preparation of Laminated Glass>

The prepared interlayer film sheet for laminated glass was sandwiched between two plastic plates (polycarbonate resin plates) having a thickness of 3.2 mm, a width of 200 mm, and a length of 200 mm, and vacuum degassed at a temperature of 150° C. for 5 minutes in a vacuum laminator, followed by vacuum pressure bonding for 5 minutes and then at 170° C. for a further 10 minutes, whereby a laminated glass test piece having the configuration plastic/interlayer film sheet/plastic was produced.

Example A4

As in Example A1, using composition 7 obtained in Production Example 11, "Preparation of interlayer film sheet for laminated glass" was performed to produce interlayer film sheet A (250 μm).

As in Example A3, using composition 11 obtained in Production Example 15, "Preparation of interlayer film sheet for laminated glass" was performed to produce interlayer film sheet B (250 μm).

"Preparation of laminated glass" was then performed as described below, and "Evaluation of adhesion strength after storage", "Evaluation of accuracy of adhesion strength after storage" and "Evaluation of impact resistance" were performed in the same manner as in Example A1. The results are shown in Table 3.

<Preparation of Laminated Glass>

The two interlayer film sheets A and B prepared were laminated on top of each other and sandwiched between a sheet of waterwhite glass and a plastic plate (polycarbonate resin plate), each having a thickness of 3.2 mm, a width of 200 mm and a length of 200 mm, and vacuum-degassed by a vacuum laminator at a temperature of 150° C. for 5 minutes, followed by vacuum pressure bonding for 5 minutes and then at 170° C. for a further 10 minutes, whereby laminated glass having the configuration glass/interlayer film sheet A/interlayer film sheet B/plastic was produced.

Example A5

As in Example A1, using composition 7 obtained in Production Example 11, "Preparation of interlayer film sheet for laminated glass" was performed to prepare interlayer film sheet A (40 μm).

"Preparation of interlayer film sheet for laminated glass" was performed to prepare interlayer film sheet C (420 μm) except that composition 5 obtained in Production Example 9 was used in Example A1 instead of using composition 7 obtained in Production Example 11.

"Preparation of laminated glass" was then performed as described below, and "Evaluation of adhesion strength after storage", "Evaluation of accuracy of adhesion strength after storage" and "Evaluation of impact resistance" were performed in the same manner as in Example A1. The results are shown in Table 3.

<Preparation of Laminated Glass>

The three interlayer film sheets A, C, and A prepared were laminated on top of one another and sandwiched between two sheets of waterwhite glass having a thickness of 3.2 mm, a width of 200 mm and a length of 200 mm, and vacuum-degassed by a vacuum laminator at a temperature of 150° C. for 5 minutes, followed by vacuum pressure bonding for 5 minutes and then at 170° C. for a further 10 minutes, whereby laminated glass having the configuration glass/interlayer film sheet A/interlayer film sheet A/glass was prepared.

Example A6

"Preparation of interlayer film sheet for laminated glass", "Preparation of laminated glass", "Evaluation of adhesion strength after storage" and "Evaluation of impact resistance" were carried out in the same manner as in Example A1 except that composition 9 obtained in Production Example 13 was used in Example A1 instead of using composition 7 obtained in Production Example 11. The results are shown in Table 3.

Example A7

"Preparation of interlayer film sheet for laminated glass", "Preparation of laminated glass", "Evaluation of adhesion strength after storage" and "Evaluation of impact resistance" were carried out in the same manner as in Example A6 except that a composition obtained by adding 0.8 parts of 2-(benzotriazole-2-yl)-4-(1,1,3,3-tetramethylbutyl)phenol (Tinuvin® 329, manufactured by BASF Japan Co., Ltd.) as an ultraviolet absorber (UVA) to composition 9 obtained in Production Example 13 was used in Example A6 instead of using composition 9 obtained in Production Example 13. The results are shown in Table 3.

Example A8

"Preparation of interlayer film sheet for laminated glass", "Preparation of laminated glass", "Evaluation of adhesion strength after storage" and "Evaluation of impact resistance" were carried out in the same manner as in Example A6 except that composition 17 obtained in Production Example 21 was used instead of using composition 9 obtained in Production Example 13 in Example A6. The results are shown in Table 3.

Comparative Example A1

"Preparation of interlayer film sheet for laminated glass", "Preparation of laminated glass", "Evaluation of adhesion strength after storage" and "Evaluation of impact resistance" were carried out in the same manner as in Example A1 except that composition 10 obtained in Production Example 14 was used instead of using composition 7 obtained in Production Example 11 in Example A1. The results are shown in Table 3.

Comparative Example A2

"Preparation of interlayer film sheet for laminated glass", "Preparation of laminated glass", "Evaluation of adhesion strength after storage" and "Evaluation of impact resistance" were carried out in the same manner as in Example A3 except that composition 12 obtained in Production Example 16 was used instead of using composition 11 obtained in Production Example 15 in Example A3. The results are shown in Table 3.

Comparative Example A3

"Preparation of interlayer film sheet for laminated glass", "Preparation of laminated glass", "Evaluation of adhesion strength after storage" and "Evaluation of impact resistance" were carried out in the same manner as in Example A5 except that composition 10 obtained in Production Example 14 was used instead of using composition 7 obtained in Production Example 9 in Example A5. The results are shown in Table 3.

TABLE 3

|  |  |  | Ex. A1 | Ex A2 | Ex A3 | Ex A4 | Ex A5 | Ex A6 |
|---|---|---|---|---|---|---|---|---|
| Interlayer configuration |  |  | Single layer | Single layer | Single layer | Double layer | Triple layer | Single layer |
| Compositions of layers | First layer | Type | Composition 7 | Composition 8 | Composition 11 | Composition 7 | Composition 7 | Composition 9 |
|  |  | Modification | Vinyltrimethozysilane | Vinyltrimethoxysilane | Maleic anhydride | Vinyltrimethoxysilane | Vinyltrimethoxysilane | Vinyltrimethoxysilane |
|  |  | Modifying group amount | 1.8 parts | 1.1 parts | 1.8 parts | 1.8 parts | 1.8 parts | 1.8 parts |
|  |  | Processing aid | — | — | — | — | — | HPB 15 parts |
|  |  | UVA | — | — | — | — | — | — |
|  |  | Thickness | 500 μm | 500 μm | 500 μm | 250 μm | 40 μm | 500 μm |
|  | Second layer | Type | — | — | — | Composition 11 | Composition 5 | — |
|  |  | Modification | — | — | — | Maleic anhydride | Not performed | — |
|  |  | Modifying group amount | — | — | — | 1.8 parts | — | — |
|  |  | Thickness | — | — | — | 250 μm | 420 μm | — |
|  | Third layer | Type | — | — | — | — | Maleic anhydride 7 | — |
|  |  | Modification | — | — | — | — | Vinyltrimethoxysilane | — |
|  |  | Modifying group amount | — | — | — | — | 1.8 parts | — |
|  |  | Thickness | — | — | — | — | 40 μm | — |
| Adhesion target configuration |  |  | Glass/Glass | Glass/Glass | Plastic/Plastic | Glass/Plastic | Glass/Plastic | Glass/Glass |
| Evaluation items | Adhesion strength after storage |  | A | B | B | A/B | A | A |
|  | Accuracy of adhesion strength after storage |  | B | B | B | B/B | B | B |
|  | Impact resistance |  | B | B | A | A | A | A |

|  |  |  | Ex A7 | Ex A8 | Comp. Ex A1 | Comp. Ex A2 | Comp. Ex A3 |
|---|---|---|---|---|---|---|---|
|  | Interlayer configuration |  | Single layer | Single layer | Single layer | Single layer | Triple layer |
|  | Compositions of layers | First layer | Type | Composition 9 + UVA | Composition 17 | Composition 10 | Composition 12 | Composition 10 |
|  |  | Modification | Vinyltrimethoxy silane | Vinyltrimethoxysilane | Vinyltrimethoxysilane | Maleic anhydride | Vinyltrimethoxysilane |
|  |  | Modifying group amount | 1.8 parts | 1.8 parts | 1.8 parts | 1.8 parts | 1.8 parts |
|  |  | Processing aid | HPB 15 parts | HPB 15 pans | — | — | — |
|  |  | UVA | 0.8 parts | — | — | — | — |
|  |  | Thickness | 500 μm | 500 μm | 500 μm | 500 μm | 40 μm |
|  |  | Second layer | Type | — | — | — | — | Composition 3 |
|  |  |  | Modification | — | — | — | — | Not performed |
|  |  |  | Modifying group amount | — | — | — | — | — |
|  |  |  | Thickness | — | — | — | — | 420 μm |
|  |  | Third layer | Type | — | — | — | — | Maleic anhydride 3 |
|  |  |  | Modification | — | — | — | — | Vinyltrimethoxysilane |

TABLE 3-continued

|  |  |  |  |  |  |  |
|---|---|---|---|---|---|---|
|  | Modifying group amount | — | — | — | — | 1.8 parts |
|  | Thickness | — | — | — | — | 40 μm |
| Adhesion target configuration |  | Glass/ Glass | Glass/ Glass | Glass/ Glass | Glass/ Plastic | Glass/ Glass |
| Evaluation items | Adhesion strength after storage | A | A | C | D | C |
|  | Accuracy of adhesion strength after storage | A | B | C | C | B |
|  | Impact resistance | A | A | B | A | B |

Example B1

"Preparation of sealing material", "Evaluation of adhesion strength after storage", and "Evaluation of transmittance after storage" were carried out as described below. The results are shown in Table 4.
<Preparation of Sealing Material>

Composition 2 obtained in Production Example 6 was kneaded using a twin-screw extruder ("TEM37B", manufactured by Toshiba Machine Co., Ltd.) at a resin temperature of 210° C. for a residence time of 80 to 90 seconds, extruded into a strand, air-cooled, and cut by a pelletizer to obtain pellets of a solar cell element sealing material containing an alkoxysilylated polymer.

The obtained pellets of solar cell element sealing material were heated at 50° C. for 4 hours using a hot air dryer with circulating air to remove dissolved air. Using a T-die film melt extrusion molding machine (T-die width: 300 mm) with a resin melt extruder equipped with a 25 mm-diameter screw, the solar cell element sealing material was then extruded at a melting temperature of 200° C., a T die temperature of 200° C. and a roll temperature of 50° C. into a sheet to prepare an extrusion-molded sheet (single-layer sealing material) having a thickness of 500 μm and a width of 280 mm. The obtained extrusion-molded sheet (single-layer sealing material) was wound on a roll for recovery.
<Evaluation of Adhesion Strength after Storage>

An extrusion molded sheet was placed on a soda lime glass substrate having a thickness of 2 mm, a width of 25 mm, and a length of 65 mm with a non-adhesion portion provided on the end of the sheet and subjected to heating/pressing treatment at 50° C. for 10 minutes and then at 180° C. for 10 minutes for bonding using a vacuum laminator (PVL0202S, manufactured by Nisshinbo Mechatronics Co. Ltd.) to prepare a test piece for peeling test. Similar test pieces were prepared and five test pieces were stored in a high-temperature and high-humidity environment (85° C., 85% humidity) for 1,000 hours. Adhesion strength after storage (average) and its accuracy (coefficient of variation) were evaluated by measuring peel strength of each test piece in a 90° peeling test based on JIS K 6854-1, wherein a 10 mm-wide cut is made on the center in the width direction of the sheet surface and the non-adhesion portion is pulled at a peeling rate of 50 mm/min. The evaluation criteria are as described below. The higher the peel strength, the better adhesion to glass.
<<Evaluation Criteria for Adhesion Strength>>
 A: 30 N/cm or more
 B: 25 N/cm or more and less than 30 N/cm
 C: 20 N/cm or more and less than 25 N/cm
 D: less than 20 N/cm <<Evaluation Criteria for Accuracy>>>
 A: 2% or less
 B: greater than 2% and 5% or less
 C: greater than 5% and 10% or less
 D: greater than 10%
<Evaluation of Transmittance after Storage>

The obtained extrusion molded sheet (single layer sealing material) was stored in a high temperature and high humidity environment (85° C., 85% humidity) for 1,000 hours and subjected to heating/pressing treatment at 150° C. for 10 minutes using a vacuum laminator (PVL0202S, manufactured by Nisshinbo Mechatronics Co., Ltd.). Transmittance was measured according to ASTM D-1003 to evaluate transmittance after storage. The evaluation criteria are as follows:
<<Evaluation Criteria>>
 A: 90% or more
 B: 80% or more and less than 90%
 C: 70% or more and less than 80%
 D: less than 70%

Example B2

"Preparation of sealing material", "Evaluation of adhesion strength after storage" and "Evaluation of transmittance after storage" were carried out in the same manner as in Example B except that Composition 7 obtained in Production Example 11 was used instead of using Composition 2 obtained in Production Example 6 in Example B1. The results are shown in Table 4.

Example B3

"Preparation of sealing material", "Evaluation of adhesion strength after storage" and "Evaluation of transmittance after storage" were carried out in the same manner as in Example B except that Composition 8 obtained in Production Example 12 was used instead of using Composition 2 obtained in Production Example 6 in Example B1. The results are shown in Table 4.

Example B4

"Evaluation of adhesion strength after storage" and "evaluation of transmittance after storage" were performed in the same manner as in Example B1 except that "preparation of sealing material" was performed as described below. The results are shown in Table 4.
<Preparation of Sealing Material>

An extrusion molded sheet (single layer sealing material) was obtained in the same manner as in Example B1 except that thickness was changed to 305 μm and Composition 2 obtained in Production Example 6 was used. Further, an extrusion molded sheet (single layer sealing material) was obtained in the same manner as in Example B1 except that thickness was changed to 50 μm and composition 7 obtained in Production Example 11 was used. The obtained two extruded sheets were cut to a size of 200 mm×200 mm, placed on top of each other, sandwiched by releasable PET films (thickness: 100 μm), and using the vacuum laminator, vacuum degassed for 5 minutes at a temperature of 180° C. and vacuum pressed for 10 minutes to prepare a two-layer sealing material having a thickness of 350 μm.

Example B5

"Preparation of sealing material", "Evaluation of adhesion strength after storage" and "Evaluation of transmittance after storage" were carried out in the same manner as in Example B1 except that a composition obtained by adding 0.8 parts of 2-(benzotriazole-2-yl)-4-(1,1,3,3-tetramethyl-butyl)phenol (Tinuvin® 329 ("Tinuvin" is a registered trademark in Japan, other countries, or both), manufactured by BASF Japan Co., Ltd.) as an ultraviolet absorber (UVA) to composition 9 obtained in Production Example 13 was used in Example B1 instead of using composition 2 obtained in Production Example 6. The results are shown in Table 4.

Example B6

"Preparation of sealing material", "Evaluation of adhesion strength after storage" and "Evaluation of transmittance after storage" were carried out in the same manner as in Example B1 except that composition 17 prepared in Production Example 21 was used in Example B1 instead of using composition 2 prepared in Production Example 6. The results are shown in Table 4.

Comparative Example B1

"Preparation of sealing material", "Evaluation of adhesion strength after storage" and "Evaluation of transmittance after storage" were carried out in the same manner as in Example B1 except that Composition 3 obtained in Production Example 7 was used in Example B1 instead of using Composition 2 obtained in Production Example 6. The results are shown in Table 4.

Comparative Example B2

"Preparation of sealing material", "Evaluation of adhesion strength after storage" and "Evaluation of transmittance after storage" were carried out in the same manner as in Example B1 except that except that Composition 10 obtained in Production Example 14 was used in Example B1 instead of using Composition 2 obtained in Production Example 6. The results are shown in Table 4.

TABLE 4

| | | | Ex. B1 | Ex. B2 | Ex. B3 | Ex. B4 | Ex. B5 |
|---|---|---|---|---|---|---|---|
| Configuration of sealing material | | | Single layer | Single layer | Single layer | Double layer | Single layer |
| Compositions of layers | First layer | Type | Composition 2 | Composition 7 | Composition 8 | Composition 2 | Composition 9 + UVA |
| | | Modification | Not performed | Vinyltrimethoxy-silane | Vinyltrimethoxy-silane | Not performed | Vinyltrimethoxy-silane |
| | | Modifying group amount | — | 1.8 parts | 1.1 parts | — | 1.8 parts |
| | | Processing aid | — | — | — | — | HPB 15 parts |
| | | UVA | — | — | — | — | 0.8 parts |
| | Second layer | Type | — | — | — | Composition 7 | — |
| | | Modification | — | — | — | Vinyltrimethoxy-silane | — |
| | | Modifying group amount | — | — | — | 1.8 parts | — |
| Evaluation items | Adhesion strength after storage | | B | A | B | A | A |
| | Accuracy of adhesion strength after storage | | B | B | B | B | A |
| | Transmittance after storage | | B | B | A | B | B |

| | | | Ex. B6 | Comp. Ex. B1 | Comp. Ex. B2 |
|---|---|---|---|---|---|
| Configuration of sealing material | | | Single layer | Single layer | Single layer |
| Compositions of layers | First layer | Type | Composition 17 | Composition 3 | Composition 10 |
| | | Modification | Vinyltrimethoxy-silane | Not performed | Vinyltrimethoxy-silane |
| | | Modifying group amount | 1.8 parts | — | 1.8 parts |
| | | Processing aid | HPB 15 parts | — | — |
| | | UVA | — | — | — |

TABLE 4-continued

|  |  |  |  |  |  |
|---|---|---|---|---|---|
|  | Second layer | Type | — | — | — |
|  |  | Modification | — | — | — |
|  |  | Modifying group amount | — | — | — |
| Evaluation items |  | Adhesion strength after storage | A | D | C |
|  |  | Accuracy of adhesion strength after storage | B | C | C |
|  |  | Transmittance after storage | B | B | B |

Example C1

As described below, "Preparation of optical film", "Evaluation of retardation accuracy", "Evaluation of light leakage" and "Evaluation of light leakage after storage" were carried out. The results are shown in Table 5.
<Preparation of Optical Film>
Composition 1 obtained in Production Example 5 was subjected to heat treatment for 4 hours at 50° C. using a hot air dryer with circulating air. Pellets after heat treatment were fed within 1 hour to an extruder equipped with a T-type die having a polymer filter and a die slip made of tungsten carbide having an average surface roughness Ra of 0.03 µm along the entire width of the die slip, extruded into a sheet on a casting drum held at 80° C. at a cylinder temperature of 230° C., and cooled without stretching to prepare an elongated molten extruded film having a thickness of 150 µm was. The molten extruded film was wound onto a roll.

The molten extruded film was then withdrawn from the roll, continuously fed to a tenter stretcher such as that shown in FIG. 1 of WO2015/005292 and stretched at 01=45° at a stretching zone temperature of 143° C. with the running speeds of the gripping means of the tenter stretcher being substantially equal for opposite ends of the film. In this way an optical film (diagonally stretched film) having a width of 1,900 mm was prepared. After stretching, opposites ends of the stretched film were trimmed while leaving a center portion that is 1,340 mm along the width of the obtained stretched film, and the trimmed stretched film was wound on a roll to prepare an optical film having a width of 1,340 mm.
<Evaluation of Retardation Accuracy>
Retardation was measured at 5 cm intervals across the 1,340 mm central portion of the film at 590 nm along the width of the optical film using a retardation meter ("KOBRA® 21-ADH" "KOBRA" is a registered trademark in Japan, other counties, or both) manufactured by Oji Scientific Instruments) and an average was recoded as a measured value. Further, a difference between the average value and the maximum or minimum value of retardation, whichever is larger, was evaluated as retardation accuracy (%). The evaluation criteria are as follows:
<<Evaluation Criteria>>
 A: 1% or less
 B: greater than 1% and 2% or less
 C: greater than 2% and 3% or less
 D: greater than 3%
<Evaluation of Light Leakage>
Two prepared optical films were bonded together with their stretching axes perpendicular to each other to produce a laminate. The laminate was sandwiched between polarizing plates so that the stretching axis of each stretched film is 45 degrees with respect to the transmission axis of the polarizing plates. Next, using a backlight, light was allowed to pass through the laminate sandwiched by the polarizing plates. An illuminance meter (51001, manufactured by Yokogawa Meter & Instruments Co., Ltd.) was placed at a position 30 mm from the polarizing plate in normal direction and illuminance was measured for evaluating light leakage. The evaluation criteria are as described below. A backlight having an illuminance of 5,000 lux and a backlight having an illuminance of 10,000 lux were used.
<<Evaluation Criteria>>
 A: Transmitted illuminance is less than 200 lux for both 5,000 lux and 10,000 lux backlights.
 B: Transmitted illuminance is less than 200 lux for 5,000 lux backlight and 200 lux or more and less than 300 lux for 10,000 lux backlight
 C: Transmitted illuminance is 200 lux or more and less than 300 lux for both 5,000 lux and 10,000 lux backlights.
 D: Transmitted illuminance is 300 lux or more for both 5,000 lux and 10,000 lux backlights
<Evaluation of Light Leakage after Storage>
The produced optical film was stored in a high-temperature and high-humidity environment (85° C., 85% humidity) for 1,000 hours and light leakage was evaluated as described above to evaluate light leakage after storage. The evaluation criteria are as follows:
<<Evaluation Criteria>>
 A: Transmitted illuminance is less than 200 lux for both 5,000 lux and 10,000 lux backlights.
 B: Transmitted illuminance is less than 200 lux for 5,000 lux backlight and 200 lux or more and less than 300 lux for 10,000 lux backlight
 C: Transmitted illuminance is 200 lux or more and less than 300 lux for both 5,000 lux and 10,000 lux backlights.
 D: Transmitted illuminance is 300 lux or more for both 5,000 lux and 10,000 lux backlights Example C2

"Preparation of optical film", "Evaluation of retardation accuracy", "Evaluation of light leakage" and "Evaluation of light leakage after storage" were performed in the same manner as in Example C1 except that Composition 2 obtained in Production Example 6 was used in Example C1 instead of Composition 1 obtained in Production Example 5. The results are shown in Table 5.

Example C3

"Preparation of optical film", "Evaluation of retardation accuracy", "Evaluation of light leakage" and "Evaluation of light leakage after storage" were performed in the same manner as in Example C1 except that Composition 15 obtained in Production Example 19 was used in Example C1 instead of Composition 1 obtained in Production Example 5. The results are shown in Table 5.

Comparative Example C1

"Preparation of optical film", "Evaluation of retardation accuracy", "Evaluation of light leakage" and "Evaluation of light leakage after storage" were performed in the same manner as in Example C1 except that Composition 3 obtained in Production Example 7 was used in Example C1 instead of Composition 1 obtained in Production Example 5. The results are shown in Table 5.

Comparative Example C2

"Preparation of optical film", "Evaluation of retardation accuracy", "Evaluation of light leakage" and "Evaluation of light leakage after storage" were performed in the same manner as in Example C1 except that Composition 4 obtained in Production Example 8 was used in Example C1 instead of Composition 1 obtained in Production Example 5. The results are shown in Table 5.

until water leak occurred. In this way strength accuracy was evaluated. The evaluation criteria are as follows:

<<Evaluation Criteria>>
A: 10% or less
B: greater than 10% and 20% or less
C: greater than 20% and 30% or less
D: greater than 30%

<Evaluation of Elution>

Before and after gamma irradiation, a test piece having a length of 60 mm and a width of 10 mm was cut from the infusion bag, and elution was evaluated by conducting an elution test in accordance with "Test Methods for Plastic Medicine Containers" of the Japanese Pharmacopoeia, 16th revision to evaluate a pH difference. The evaluation criteria are as follows.

<<Evaluation Criteria>>
A: Within ±0.6
B: greater than ±0.6 and ±0.8 or less
C: greater than ±0.8 and ±1.0 or less
D: greater than ±1.0

TABLE 5

| | | Ex. C1 | Ex. C2 | Ex. C3 | Comp. Ex. C1 | Comp. Ex. C2 |
|---|---|---|---|---|---|---|
| Composition of optical film | Type | Composition 1 | Composition 2 | Composition 15 | Composition 3 | Composition 4 |
| | Modification | Not performed | Not performed | Not performed | Not performed | Not performed |
| Evaluation items | Retardation accuracy | A | A | A | C | C |
| | Light leakage | B | A | A | B | B |
| | Light leakage after storage | B | A | B | D | D |

Example D1

As described below, "Preparation of infusion bag", "Evaluation of strength accuracy", "Evaluation of elution" and "Evaluation of bleed-out" were performed. The results are shown in Table 6. Note that the antioxidant amount parameter was not applicable (W was small and did not satisfy the Equation 1 given below).

$$W = [0.46 \times (100-H) + 0.04] \times (E/25) \quad \text{Equation 1}$$

<Preparation of Infusion Bag>

A sheet was prepared in the same manner as in Example A1 except that thickness was changed to 200 μm and Composition 1 obtained in Production Example 5 was used. An infusion bag was prepared by cutting the obtained sheet into sheets of 15 cm×15 cm size, laminating two of the sheets on top of each other and heat-sealing three sides of the laminate.

Ten of these infusion bags were placed in linear low density polyethylene (LLDPE) bags with dimensions of 35 cm×25 cm and 0.05 mm thick and sealed by heat sealing. Such sealed infusion bags were further packaged in 45 L linear low density polyethylene (LLDPE) bags and packaged in a cardboard box. Sterilization treatment was carried out by gamma irradiation (dose: 25kGy, KOGA ISOTOPE Ltd.) while packaged in the cardboard box.

<Evaluation of Strength Accuracy>

Five sterilized infusion bags were prepared in which 100 g of water was placed and the remaining one side was heat-sealed. With reference to JIS Z 2020, the bags were dropped from a height of 1 m in an upright position. If no water leakage occurred, dropping was repeated until water leak occurred, and the coefficient of variation (standard deviation/average value×100) was calculated from the average value and the standard deviation of the numbers of drops until water leak occurred. In this way strength accuracy was evaluated. The evaluation criteria are as follows:

<Evaluation of Bleed-Out>

The surface of the prepared infusion bag was observed visually and an IR spectrum of the interior of the wall of the infusion bag and an IR spectrum over time of the surface of the infusion bag were measured. Using IR spectra of the infusion bag 30 days after forming, bleed-out was evaluated based on the ratio of the intensities of absorption bands derived from surface and internal antioxidants (surface intensity/interior intensity). The evaluation criteria are as follows:

<<Evaluation Criteria>>
A: 1.2 times or less
B: greater than 1.2 times or more and 1.3 times or less
C: greater than 1.3 times or more and 1.5 times or less
D: greater than 1.5 times

Example D2

"Preparation of vial", "Evaluation of strength accuracy", "Evaluation of elution" and "Evaluation of bleed-out" were performed as described below. The results are shown in Table 6. Note that the antioxidant amount parameter was not applicable (W was small and did not satisfy the Equation 1).

<Preparation of Vial>

Composition 2 obtained in Production Example 6 was first injection molded using an injection blow molding machine (ASB-50 MB, manufactured by Nisshin ASB Machinery Co., Ltd.) at a cylinder temperature of 240° C. and an injection mold temperature of 60° C. to prepare a preform, which was subjected to blow molding at a heating pot temperature of the preform of 150° C. under a blow pressure 0.5 MPa and a blow mold temperature of 60° C. to prepare a single-layer vial having a diameter of 50 mm, a height of 90 mm and a sidewall thickness of 1 mm.

Ten of these vial were placed in linear low density polyethylene (LLDPE) bags with dimensions of 35 cm×25 cm and 0.05 mm thick and sealed by heat sealing. Such sealed vials were further packaged in 45L linear low density polyethylene (LLDPE) bags and packaged in a cardboard box. Sterilization treatment was carried out by gamma irradiation (dose: 25kGy, KOGA ISOTOPE Ltd.) while packaged in the cardboard box.

<Evaluation of Strength Accuracy>

Five sterilized vials were prepared in which 100 g of water was placed and then sealed with a rubber stopper. Strength accuracy was evaluated in the same manner as in Example D1

<Evaluation of Elution>

Before and after gamma irradiation, a test piece having a length of 60 mm and a width of 10 mm was cut out from the side surface of the vial, and elution was evaluated in the same manner as in Example D1

<Evaluation Bleed-Out>

The surface of the vial obtained by injection blow molding was evaluated for bleed-out as in Example D1.

Example D3

"Preparation of vial", "Evaluation of strength accuracy", "Evaluation of elution" and "Evaluation of bleed-out" were performed in the same manner as in Example D2 except that composition 13 obtained in Production Example 17 was used in Example D2 instead of using composition 2 obtained in Production Example 6. The results are shown in Table 6. Note that the antioxidant amount parameter was applicable (satisfying the above Equation 1)

Example D4

"Preparation of vial", "Evaluation of strength accuracy", "Evaluation of elution" and "Evaluation of bleed-out" were performed in the same manner as in Example D2 except that except that composition 14 obtained in Production Example 18 was used in Example D2 instead of using composition 2 obtained in Production Example 6. The results are shown in Table 6. Note that the antioxidant amount parameter was not applicable (W was large and did not satisfy the above Equation 1).

Example D5

"Preparation of vial", "Evaluation of strength accuracy", "Evaluation of elution" and "Evaluation of bleed-out" were performed in the same manner as in Example D2 except that composition 18 obtained in Production Example 22 was used in Example D2 instead of using Composition 2 obtained in Production Example 6. The results are shown in Table 6. Note that the antioxidant amount parameter was applicable (satisfying the above Equation 1).

Comparative Example D1

"Preparation of infusion bag", "Evaluation of strength accuracy", "Evaluation of elution" and "Evaluation of bleed-out" were performed in the same manner as in Example D1 except that except that composition 3 obtained in Production Example 7 was used in Example D1 instead of using composition 1 obtained in Production Example 5. The results are shown in Table 6. Note that the antioxidant amount parameter was not applicable (W was small and did not satisfy the above Equation 1).

Comparative Example D2

"Preparation of vial", "Evaluation of strength accuracy", "Evaluation of elution" and "Evaluation of bleed-out" were performed in the same manner as in Example D2 except that composition 4 obtained in Production Example 8 was used in Example D2 instead of using composition 2 obtained in Production Example 6. The results are shown in Table 6. Note that the antioxidant amount parameter was not applicable (W was small and did not satisfy the above Equation 1).

TABLE 6

| | | Ex. D1 | Ex. D2 | Ex. D3 | Ex. D4 | Ex D5 | Comp. Ex. D1 | Comp. Ex. D2 |
|---|---|---|---|---|---|---|---|---|
| Composition | | Composition 1 | Composition 2 | Composition 13 | Composition 14 | Composition 18 | Composition 3 | Composition 4 |
| Modification | | Not performed | Not performed | Not performed | Not performed | Not performed | Not performed | Not performed |
| Medical shaped article | | Infusion bag | Vial | Vial | Vial | Vial | Infusion bag | Vial |
| Antioxidant amount | | — | — | 0.10 parts | 0.55 parts | 0.10 parts | — | — |
| Antioxidant amount parameter | | N/A (low) | N/A (low) | Applicable | N/A (high) | Applicable | N/A (low) | N/A (low) |
| Evaluation items | Strength accuracy | B | A | A | A | B | D | D |
| | Elution | B | B | A | A | A | B | B |
| | Bleed-out | A | A | A | B | A | A | A |

Example E1

As described below, "preparation of adhesive", "Evaluation of adhesion strength after storage", and "Evaluation of dielectric constant" were performed. The results are shown in Table 7.

<Preparation of Adhesive>

100 parts of composition 6 obtained in Production Example 10 was dissolved in 300 parts of toluene (boiling point: 110° C.) and 1 part of 3-glycidoxypropyltrimethoxysilane (KBM-403, manufactured by Shin-Etsu Silicone Co., Ltd.) as a silane coupling agent was added to the mixture and uniformly mixed to prepare an adhesive solution.

<Evaluation of Adhesion Strength after Storage>

The adhesive solution was applied onto one side of copper foil (thickness: 10 to 50 μm) so that the adhesive layer after solvent removal has a thickness of 15 μm while leaving a portion not coated with the adhesive solution, and the solvent was removed by evaporation in an inert oven.

The copper foil coated with the adhesive was cut into a test piece which includes the portion not coated with the adhesive so that the coated surface has a size of 15 mm width and 150 mm length. Next, the test piece and a polyimide resin film (thickness: 50 μm) were placed on top of each other and bonded together by heating and pressuring under a predetermined condition to prepare a test piece for peel strength measurement.

The produced test piece was stored in a high-temperature and high-humidity environment (85° C., 85% humidity) for 1,000 hours. Part the copper foil not coated with the adhesive was fixed to a tensile testing machine ("AGS-10KNX", manufactured by Shimadzu Corporation), and a T-shaped peel test was performed at a peel rate of 100 mm/min in accordance with JIS K 6854-3 to evaluate adhesion strength after storage. The evaluation criteria are as follow:

<<Evaluation Criteria>>
A: 15 N/cm or more
B: greater than 10 N/cm and less than 15 N/cm
C: greater than 4 N/cm and less than 10 N/cm
D: less than 4 N/cm <Evaluation of Dielectric Constant>

The adhesive solution was applied onto a releasable PET film (100 μm thick) so that the thickness of the adhesive layer was 20 to 30 μm, and the solvent was removed by evaporation in an inert oven. The adhesive layer was peeled from the releasable PET film. Numerous adhesive layers were prepared similarly and placed on top of one another and subjected to vacuum press molding at 140° C. to form an adhesive sheet having a thickness of 700 to 760 μm. The obtained adhesive sheet was subjected to heat treatment at 150° C. for 1 hour in the inert oven to remove volatile components to prepare a sample for dielectric constant evaluation. A test piece having a length of 80 mm and a width of 1.5 mm was fabricated from the adhesive sheet and measured and evaluated for relative dielectric constant at 5 GHz by the cavity perturbation method (ASTM D2520). The evaluation criteria are as follows:

<<Evaluation Criteria>>
A: 2.5 or less
B: greater than 2.5 and 3.0 or less
C: greater than 3.0 and 4.0 or less
D: greater than 4.0

Example E2

"Evaluation of adhesion strength after storage" and "Evaluation of dielectric constant" were performed in the same manner as in Example E1 except that "preparation of adhesive" was performed as described below. The results are shown in Table 7.

<Preparation of Adhesive>

100 parts of composition 7 obtained in Production Example 11 was dissolved in 300 parts of toluene (boiling point: 110° C.), and 1 part of 3-methacryloxypropyltrimethoxysilane (KBM-503, manufactured by Shin-Etsu Silicone Co., Ltd.) as a silane coupling agent, 2 parts of triallyl isocyanurate (TAIC® ("TAIC" is a registered trademark in Japan, other countries, or both), manufactured by Nihon Kasei CO., LTD.) as a crosslinking aid and 0.2 parts of 2,5-dimethyl-2,5-di(t-butylperoxy)hexane (PERHEXA® 25B, manufactured by NOF CORPORATION) as an organic peroxide were added and uniformly mixed to prepare an adhesive.

Example E3

"Preparation of adhesive", "Evaluation of adhesion strength after storage" and "Evaluation of dielectric constant" were performed in the same manner as in Example E2 except that composition 16 obtained in Production Example 20 was used in Example E2 instead of composition 7 obtained in Production Example 11. The results are shown in Table 7.

Comparative Example E1

"Preparation of adhesive", "Evaluation of adhesion strength after storage" and "Evaluation of dielectric constant" were performed in the same manner as in Example E1 except that except that composition 11 obtained in Production Example 15 was used in Example E1 instead of composition 6 obtained in Production Example 10. The results are shown in Table 7.

TABLE 7

|  |  | Ex. E1 | Ex. E2 | Ex. E3 | Comp. Ex. E1 |
| --- | --- | --- | --- | --- | --- |
| Composition |  | Composition 6 | Composition 7 | Composition 16 | Composition 11 |
| Modification |  | Vinyl-trimethoxysilane 1.8 parts | Vinyl-trimethoxysilane 1.8 parts | Vinyl-trimethoxysilane 1.8 parts | Maleic anhydride 1.8 parts |
| Organic solvent |  | Toluene 300 parts | Toluene 300 parts | Toluene 300 parts | Toluene 300 parts |
| Boiling point of organic solvent |  | 110° C. | 110° C. | 110° C. | 110° C. |
| Silane coupling agent |  | 3-glycidoxypropyltrimethoxysilane 1 part | 3-methacryloxypropyltrimethoxysilane 1 part | 3-methacryloxypropyltrimethoxysilane 1 part | 3-glycidoxypropyltrimethoxysilane 1 part |
| Crosslinking aid |  | — | 2 parts | 2 parts | — |
| Organic peroxide |  | — | 0.2 parts | 0.2 parts | — |
| Heat-resistant resin |  | Polyimide resin | Polyimide resin | Polyimide resin | Polyimide resin |
| Metal layer |  | Copper | Copper | Copper | Copper |
| Thickness of adhesive layer |  | 15 μm | 15 μm | 15 μm | 15 μm |
| Bonding conditions |  | Autoclave 150° C. 0.8 MPa 30 min | Autoclave 150° C. 0.8 MPa 30 min | Autoclave 150° C. 0.8 MPa 30 min | Autoclave 150° C. 0.8 MPa 30 min |
| Evaluation items | Adhesion strength after storage | B | A | A | D |
|  | Dielectric constant | A | A | A | A |

Example F1

"Preparation of assembly" and "Evaluation of adhesion strength after storage" were performed as described below. The results are shown in Table 8.

<Preparation of Assembly>

Composition 6 obtained in Production Example 10 was extruded using a two-screw extruder equipped with a T-die with a width of 400 mm ("TEM-37B", Toshiba Machine Co., Ltd.) and a sheet take-up machine equipped with an embossed roll of a pear pattern at a cylinder temperature of 200° C., a T-die temperature of 200° C., and an embossed roll temperature of 50° C. to produce sheet (F1) with a thickness of 330 μm.

A test piece with a length of 300 mm and a width of 200 mm was prepared from a polycarbonate resin sheet (S1) (Panlite Sheet, PC-2151, thickness: 0.2 mm, Teijin Chemicals Ltd.) and one side was subjected to corona discharge treatment using a corona surface treatment apparatus (A3SW-LW, Wedge Co., Ltd.) under the following conditions: output=60 W, distance between electrode and sample=10 mm, and treatment speed=1 m/min. The polycarbonate resin sheet (Sic) subjected to the corona discharge treatment and a test piece having a length of 300 mm and a width of 200 mm cut out from the sheet (F1) produced as described above were placed on top of each other so that the treated surface faces the test piece with a release film sandwiched therebetween 50 mm at the longitudinal end.

The laminate of sheet (F1) and resin sheet (Sic) was placed in a 75 μm-thick resin bag with the layer configuration: NY/adhesive layer/PP. After heat-sealing both sides of the opening of the bag with a heat sealer while leaving a 200 mm-wide area, the laminate was hermetically sealed by heat-sealing the opening while degassing the inside of the bag using a hermetically packaging machine (Panasonic, BH-951). The opening was then heat-sealed to hermetically package the laminate. The hermitically packaged laminate was then placed in an autoclave and heated at 140° C. at a pressure of 0.80 MPa for 30 minutes to produce assembly (F1/S1c).

<Evaluation of Adhesion Strength after Storage>

The manufactured assembly (F1/S1c) was stored in a high temperature and high humidity environment (85° C., humidity 85%) for 1,000 hours. Five T-shaped peel test pieces of 1 cm width were cut out from the widthwise central portion of the assembly (F1/S1c). The peel strength of the interface between sheet (F1) and resin sheet (Sic) was measured for each test piece and an average value and a standard deviation were calculated. Taking the average value as adhesion strength after storage, a coefficient of variation (standard deviation/average value×100) was evaluated as adhesion accuracy after storage. The evaluation criteria are as follows:

<<Evaluation Criteria for Adhesion Strength>>
A: 12 N/cm or more
B: 8 N/cm or more and less than 12 N/cm
C: 4 N/cm or more and less than 8 N/cm
D: less than 4 N/cm <<Evaluation Criteria for Accuracy>>>
A: 2% or less
B: greater than 2% and 5% or less
C: greater than 5% and 10% or less
D: greater than 10%

Example F2

"Preparation of assembly" and "Evaluation of adhesion strength after storage" were carried out in the same manner as in Example F1 except that composition 7 obtained in Production Example 11 was used in Example F1 instead of using composition 6 obtained in Production Example 10. The results are shown in Table 8.

Example F3

"Preparation of assembly" and "Evaluation of adhesion strength after storage" were carried out in the same manner as in Example F1 except that composition 9 obtained in Production Example 13 was used in Example F1 instead of using composition 6 obtained in Production Example 10. The results are shown in Table 8.

Example F4

"Preparation of assembly" and "Evaluation of adhesion strength after storage" were carried out in the same manner as in Example F1 except that composition 17 obtained in Production Example 21 was used in Example F1 instead of using composition 6 obtained in Production Example 10. The results are shown in Table 8.

Comparative Example F1

"Preparation of assembly" and "Evaluation of adhesion strength after storage" were carried out in the same manner as in Example F1 except that composition 10 obtained in Production Example 14 was used in Example F1 instead of using composition 6 obtained in Production Example 10. The results are shown in Table 8.

TABLE 8

|  |  | Ex. F1 | Ex. F2 | Ex. F3 | Ex. F4 | Comp. Ex. F1 |
|---|---|---|---|---|---|---|
| Composition |  | Composition 6 | Composition 7 | Composition 9 | Composition 17 | Composition 10 |
| Modification |  | Vinyl-trimethoxysilane 1.8 parts | Vinyl-trimethoxysilane 1.8 parts | Vinyl-trimethoxysilane 1.8 parts | Vinyl-trimethoxysilane 1.8 parts | Vinyl-trimethoxysilane 1.8 parts |
| Activation treatment |  | Performed | Performed | Performed | Performed | Performed |
| Heat bonding |  | Performed | Performed | Performed | Performed | Performed |
| Processing aid |  | — | — | HPB 15 parts | HPB 15 parts | — |
| Evaluation items | Adhesion strength after storage | B | A | A | A | D |
|  | Accuracy of adhesion strength after storage | B | B | A | A | C |

INDUSTRIAL APPLICABILITY

According to the present disclosure, it is possible to provide a hydrogenated copolymer which can increase mold printability and reduce film thickness unevenness upon film forming, a hydrogenated copolymer-containing composition comprising the hydrogenated copolymer, a method of producing the hydrogenated copolymer, an interlayer film for laminated glass comprising a modified product of the hydrogenated copolymer, an interlayer film laminate for laminated glass comprising two or more laminated layers of the interlayer film for laminated glass, a sealing material comprising the hydrogenated copolymer, a sealing material comprising a modified product of the hydrogenated copolymer, an optical film comprising the hydrogenated copolymer, a medical shaped article formed from the hydrogenated copolymer-containing composition, a method of producing the medical shaped article, an adhesive comprising a modified product of the hydrogenated copolymer, an assembly in which an adhesive sheet comprising the adhesive and a thermoplastic resin sheet are laminated, and a method of producing the assembly.

REFERENCE SIGNS LIST

30 HSIS layer
40 Si-HSIS layer
50 Acid anhydride group-modified HSIS layer
300 Interlayer film laminate for glass
310 Interlayer film laminate for glass
320 Interlayer film laminate for glass
330 Interlayer film laminate for glass
340 interlayer film laminate for glass 0 0 0 1

The invention claimed is:

1. A hydrogenated copolymer obtained by hydrogenating a copolymer comprising an aromatic vinyl monomer unit and a chain conjugated diene monomer unit, wherein
an elution curve measured by gel permeation chromatography (GPC) of a sample containing the hydrogenated copolymer has at least two hydrogenated copolymer-derived peaks, and when, among the at least two hydrogenated copolymer-derived peaks, a hydrogenated copolymer-derived peak exhibiting a peak top with the earliest elution time is defined as a first peak and a hydrogenated copolymer-derived peak exhibiting a peak top with the second earliest elution time is defined as a second peak, the ratio of a standard polystyrene-equivalent molecular weight based on the elution time of the first peak (first peak molecular weight) to a standard polystyrene-equivalent molecular weight based on the elution time of the second peak (second peak molecular weight) (first peak molecular weight/second peak molecular weight) is 1.50 or more, and the second peak molecular weight is 1,000 or more,
the hydrogenated copolymer is obtained by hydrogenating carbon-carbon unsaturated bonds of a main chain and side chains of a block copolymer comprising at least two polymer blocks [A] comprising an aromatic vinyl monomer unit as a main component and at least one polymer block [B] comprising a chain conjugated diene monomer unit as a main component, and
an aromatic vinyl monomer capable of forming the aromatic vinyl monomer unit is selected from styrene and derivatives thereof.

2. The hydrogenated copolymer according to claim 1, wherein the first peak molecular weight is 15,000 or more and 200,000 or less.

3. The hydrogenated copolymer according to claim 1, wherein when a mass fraction of a total aromatic vinyl monomer unit in the block copolymer is defined as wA and a mass fraction of a total chain conjugated diene monomer unit in the block copolymer is defined as wB, the ratio of wA to wB (wA:wB) is 20:80 to 60:40.

4. The hydrogenated copolymer according to claim 3, wherein 90% or more of carbon-carbon unsaturated bonds of aromatic rings of the block copolymer are hydrogenated.

5. The hydrogenated copolymer according to claim 3, wherein the block copolymer is a triblock or pentablock copolymer.

6. A hydrogenated copolymer-containing composition comprising:
the hydrogenated copolymer according to claim 1; and
at least either a phosphorous antioxidant or a phenol anti-aging agent,
wherein a total amount of the phosphorus antioxidant and the phenol antioxidant is 0.001 parts by mass or more and 1.0 part by mass or less per 100 parts by mass of the hydrogenated copolymer.

7. A hydrogenated copolymer-containing composition comprising:
the hydrogenated copolymer according to claim 1; and
a processing aid,
wherein an amount of the processing aid is 40 parts by mass or less per 100 parts by mass of the hydrogenated copolymer.

* * * * *